(12) United States Patent
Vining et al.

(10) Patent No.: US 12,099,976 B2
(45) Date of Patent: Sep. 24, 2024

(54) GROUP ELIGIBILITY CRITERIA BUILDER

(71) Applicant: ADP, INC., Roseland, NJ (US)

(72) Inventors: Kyle Vining, Marlborough, MA (US); Peter Faria, Marlborough, MA (US); Ashish Garwal, Hyderabad (IN); Pooja Keswani, Pune (IN); Carl Pereira, Marlborough, MA (US)

(73) Assignee: ADP, Inc., Roseland, NJ (US)

( * ) Notice: Subject to any disclaimer, the term of this patent is extended or adjusted under 35 U.S.C. 154(b) by 115 days.

(21) Appl. No.: 17/303,202

(22) Filed: May 24, 2021

(65) Prior Publication Data

US 2022/0374842 A1   Nov. 24, 2022

(51) Int. Cl.
| | |
|---|---|
| G06F 3/0484 | (2022.01) |
| G06F 3/0482 | (2013.01) |
| G06F 3/0486 | (2013.01) |
| G06F 8/34 | (2018.01) |
| G06F 16/242 | (2019.01) |
| G06F 16/2455 | (2019.01) |
| G06Q 10/105 | (2023.01) |
| G06Q 10/1057 | (2023.01) |

(52) U.S. Cl.
CPC ....... *G06Q 10/1057* (2013.01); *G06F 3/0482* (2013.01); *G06F 3/0484* (2013.01); *G06F 3/0486* (2013.01); *G06F 8/34* (2013.01); *G06F 16/242* (2019.01); *G06F 16/2428* (2019.01); *G06F 16/2455* (2019.01); *G06Q 10/105* (2013.01)

(58) Field of Classification Search
None
See application file for complete search history.

(56) References Cited

U.S. PATENT DOCUMENTS

| | | | |
|---|---|---|---|
| 9,064,053 B2 * | 6/2015 | Campbell | G06F 11/3684 |
| 2006/0041458 A1 * | 2/2006 | Ringrose | G06Q 10/06 705/7.11 |
| 2007/0192720 A1 * | 8/2007 | Alsup | G06F 3/0486 715/769 |

(Continued)

OTHER PUBLICATIONS

Oracle Fusion Middleware, Metadata Repository Builder's Guide for Oracle Business Intelligence Enterprise Edition 12c (12.2.1.2.0), p. 179, Oct. 2017.

*Primary Examiner* — Xuyang Xia
(74) *Attorney, Agent, or Firm* — Foley & Lardner LLP

(57) ABSTRACT

A system, method implemented on a computer system, and computer program product for generating an expression. A graphical representation of the expression comprising criteria blocks and logical operator blocks is displayed on a user interface. Each of the criteria blocks includes criteria information defining a criteria, an edit block control element, and a delete block control element. A user interface to receive changes to the criteria information for a selected criteria block is displayed in response to selecting the edit block control element for the selected criteria block. The selected criteria block is deleted from the expression in response to selecting the delete block control element for the selected criteria block. A building block may be used to define criteria for criteria blocks in several expressions. Criteria for expressions defined using a building block are changed automatically in response to changes to the building block.

39 Claims, 21 Drawing Sheets

(56) References Cited

U.S. PATENT DOCUMENTS

| | | | |
|---|---|---|---|
| 2007/0244897 A1* | 10/2007 | Voskuil | G06F 16/2308 707/999.009 |
| 2010/0161646 A1* | 6/2010 | Ceballos | G06F 16/2428 707/769 |
| 2010/0235793 A1* | 9/2010 | Ording | G06F 3/04883 345/173 |
| 2011/0202372 A1* | 8/2011 | Folsom | G06Q 40/12 705/322 |
| 2012/0290940 A1* | 11/2012 | Quine | G06F 8/34 715/744 |
| 2012/0323811 A1* | 12/2012 | McKeown | G06Q 10/103 705/320 |
| 2015/0082275 A1* | 3/2015 | Aman | G06F 8/34 717/109 |
| 2016/0057020 A1* | 2/2016 | Halmstad | H04L 41/22 715/740 |

* cited by examiner

HOME  MY COMPANY  MYSELF  PEOPLE  PROCESS  REPORTS  SETUP

Eligibility Manager (EM) ⓘ ↙↗

Rulesets (105)                                               ⊕ ADD A RULESET — 604

| Name | Created By | Creation Date | |
|---|---|---|---|
| 2012-2013ELIGIBILITY<br>Status: Currently Active | SYS_TRANSFER_IGEMBRY@TMSQA51 | August 19, 2020 | ... |
| EM-RULESET1 | JSMITH@TMSQA68 | August 11, 2020 | ... |
| NEW_RULESET | JSMITH@TMSQA68 | August 11, 2020 | ... |
| DSSS | JSMITH@TMSQA68 | August 11, 2020 | ... |
| TEST 2 | JSMITH@TMSQA68 | August 7, 2020 | ... |
| WRONG HOST OOID | JSMITH@TMSQA68 | August 17, 2020 | 606 |
| TEST CCS NEW 2  602 | JSMITH@TMSQA68 | August 17, 2020 | |
| TEST CCS NEW 1 | JSMITH@TMSQA68 | August 17, 2020 | ... |

Activate
Copy
Edit
Import
Transfer

Group memberships validated with no duplicate memberships found.

2100

Duplicate Error
Duplicate employee names (471) found in the hierarchy memberships. Download the file to review and resolve them.

2200

GROUP BUILDER  TRANSACTION LOG VIEW      COPY_2012-2013-ELIGI  ✕

Transaction Logs (32)                                                                    ⬆ EXPORT

| Start Date Clear | End Date Clear | User  | Hierarchy | | New Value |
|---|---|---|---|---|---|
| 09/01/2020 📅 | MM/DD/YYY 📅 | jsmith | MERIT ⌄ | APPLY CLEAR | true |

| | | | | | Previous Value |
|---|---|---|---|---|---|
| | | | | ◀ | false |

| TIME STAMP # | USER # | PROPERTY # | TYPE # | GROUP # |
|---|---|---|---|---|
| 09/10/2020 04:06:24 AM | JSMITH@TMSQA68 | active | Category | COPY_2012-2013-ELIGI/MERIT |
| 09/10/2020 04:04:53 AM | JSMITH@TMSQA68 | active | Category | COPY_2012-2013-ELIGI/MERIT |
| 09/06/2020 01:37:07 AM | JSMITH@TMSQA68 | expression | GroupDefinition | COPY_2012-2013-ELIGI/MERIT/VPUSA |
| 09/06/2020 01:37:07 AM | JSMITH@TMSQA68 | description | GroupDefinition | COPY_2012-2013-ELIGI/MERIT/VPUSA |
| 09/06/2020 01:37:07 AM | JSMITH@TMSQA68 | id | GroupDefinition | COPY_2012-2013-ELIGI/MERIT/VPUSA |
| 09/06/2020 01:37:07 AM | JSMITH@TMSQA68 | joinType | GroupDefinition | COPY_2012-2013-ELIGI/MERIT/VPUSA |
| 09/06/2020 01:37:07 AM | JSMITH@TMSQA68 | expression | GroupDefinition | COPY_2012-2013-ELIGI/MERIT/VPCAN |
| 09/06/2020 01:37:07 AM | JSMITH@TMSQA68 | id | GroupDefinition | COPY_2012-2013-ELIGI/MERIT/VPCAN |
| 09/06/2020 01:37:07 AM | JSMITH@TMSQA68 | description | GroupDefinition | COPY_2012-2013-ELIGI/MERIT/VPCAN |
| 09/06/2020 01:37:07 AM | JSMITH@TMSQA68 | joinType | GroupDefinition | COPY_2012-2013-ELIGI/MERIT/VPCAN |
| 09/06/2020 01:37:07 AM | JSMITH@TMSQA68 | name | Category | COPY_2012-2013-ELIGI/MERIT |
| 09/06/2020 01:37:07 AM | JSMITH@TMSQA68 | active | Category | COPY_2012-2013-ELIGI/MERIT |
| 09/06/2020 01:37:06 AM | JSMITH@TMSQA68 | description | GroupDefinition | COPY_2012-2013-ELIGI/MERIT/VPUSA |

GROUP ELIGIBILITY CRITERIA BUILDER

BACKGROUND INFORMATION

1. Field

The present disclosure relates generally to systems and methods for the development and deployment of computer programs. More particularly, illustrative embodiments are related to automated tools and methods for a user to create and modify expressions, such as expressions defining criteria for determining the eligibility of an employee to be included in a particular group, that are converted automatically to computer program code for running on a computer system.

2. Background

A human resources management system is a system implemented in software running on a computer system that is used by a business or other organization to perform various human resources functions. A human resources management system may be known also as a human resources information system or a human capital management system. Human resources functions that may be performed using a human resources management system may include, for example, without limitation, storing employee information, managing payroll, recruitment, benefits administration, time and attendance, employee performance management, tracking competency and training records, or other appropriate human resources functions or combinations of functions.

A human resources management system may be configured to determine whether an employee of a business or other organization is included in a particular group. For example, without limitation, a human resources management system may be configured to determine whether an employee is included in a particular compensation or performance plan or other appropriate group. The human resources management system may be configured to perform various human resources functions for each employee of the business or other organization in an appropriate manner based upon the compensation or performance plan, or other group, in which the employee is determined to be included.

Whether an employee of a business or other organization is included in a particular group may be determined by establishing rules that define criteria for being included in the group. The criteria for being included in a particular group may be compared to employee information for the employee to determine whether the employee is included in the group. An employee may be determined to be included in a particular group when the employee information for the employee satisfies the criteria specified in the rules that are established for being included in the group.

From time to time it may be necessary or desirable to create new groups in which employees of a business or other organization may be included or to change the rules for being included in an existing group. Therefore, new rules defining new criteria for being included in a group may be established or the criteria for being included in a group as defined in an existing rule may be changed. The new or changed criteria then may be implemented in a human resources management system in an appropriate manner.

It would be beneficial to have a tool for a user to create and change rules for including employees in groups in a human resources management system without requiring directly reprogramming the system by the user. For example, it may be desirable to have a tool for a user to effectively and efficiently create or modify expressions defining criteria for an employee to be included in a group. The expressions created or modified using the tool may be automatically converted into appropriate program code for implementation in a human resources management system.

Accordingly, it would be beneficial to have a method and apparatus that take into account one or more of the issues discussed above, as well as possibly other issues.

SUMMARY

An embodiment of the present disclosure provides an apparatus for generating an expression comprising a graphical representation user interface. The graphical representation user interface is configured to display a graphical representation of the expression comprising criteria blocks and logical operator blocks. Each of the criteria blocks includes criteria information defining a criteria, an edit block control element, and a delete block control element. In response to selecting by a user the edit block control element for a selected criteria block in the criteria blocks, a define criteria user interface is displayed. The define criteria user interface is configured to receive from the user a change to the criteria information for the selected criteria block. In response to selecting by the user the delete block control element for the selected criteria block, the selected criteria block is deleted from the expression.

Another embodiment of the present disclosure provides a method implemented in a computer system for generating an expression. A graphical representation of the expression is displayed. The graphical representation of the expression comprises criteria blocks and logical operator blocks. Each of the criteria blocks includes criteria information defining a criteria, an edit block control element, and a delete block control element. In response to selecting by a user the edit block control element for a selected criteria block in the criteria blocks, a define criteria user interface is displayed. The define criteria user interface is configured to receive from the user a change to the criteria information for the selected criteria block. In response to selecting by the user the delete block control element for the selected criteria block, the selected criteria block is deleted from the expression.

Another embodiment of the present disclosure provides a computer program product for generating an expression. The computer program product comprises a computer readable storage medium having program instructions embodied therewith. The program instructions are executable by a device to cause the device to: display a graphical representation of the expression comprising criteria blocks and logical operator blocks, wherein each of the criteria blocks includes criteria information defining a criteria, an edit block control element, and a delete block control element; in response to selecting by a user the edit block control element for a selected criteria block in the criteria blocks, display a define criteria user interface; and, in response to selecting by the user the delete block control element for the selected criteria block, delete the selected criteria block from the expression. The define criteria user interface is configured to receive from the user a change to the criteria information for the selected criteria block.

Another embodiment of the present disclosure provides an apparatus for generating expressions comprising a graphical representation user interface and a building block editor. The graphical representation user interface is configured to display graphical representations of the expressions comprising criteria blocks and logical operator blocks, wherein each of the criteria blocks includes criteria information defining a criteria, and receive a building block to define the criteria for a criteria block in each of a plurality of the expressions. The building block editor is configured to receive first criteria information to define criteria for the building block before the building block is received by the graphical representation user interface to define the criteria for the criteria block in each of the plurality of the expressions, receive second criteria information to make a change in the criteria for the building block after the building block is received by the graphical representation user interface to define the criteria for the criteria block in each of the plurality of the expressions, and, in response to receiving the second criteria information, make the change in the criteria for the criteria block in each of the plurality of the expressions that is defined by the building block.

Another embodiment of the present disclosure provides a method implemented in a computer system for generating expressions using a building block. First criteria information is received to define criteria for a building block. After receiving the first criteria information, graphical representations of the expressions comprising criteria blocks and logical operator blocks are displayed, and the building block is received to define the criteria for a criteria block in each of a plurality of the expressions. After receiving the building block to define the criteria for the criteria block in each of the plurality of the expressions, second criteria information is received to make a change in the criteria for the building block. In response to receiving the second criteria information, the change is made in the criteria for the criteria block in each of the plurality of the expressions that is defined by the building block.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 6 is an illustration of a rule set user interface in a group eligibility criteria builder in accordance with an illustrative embodiment;

FIG. 13 is an illustration of a group builder user interface in a group eligibility criteria builder in accordance with an illustrative embodiment;

FIG. 23 is an illustration of a transaction log view in a group eligibility criteria builder in accordance with an illustrative embodiment;

DETAILED DESCRIPTION

Figure 1:
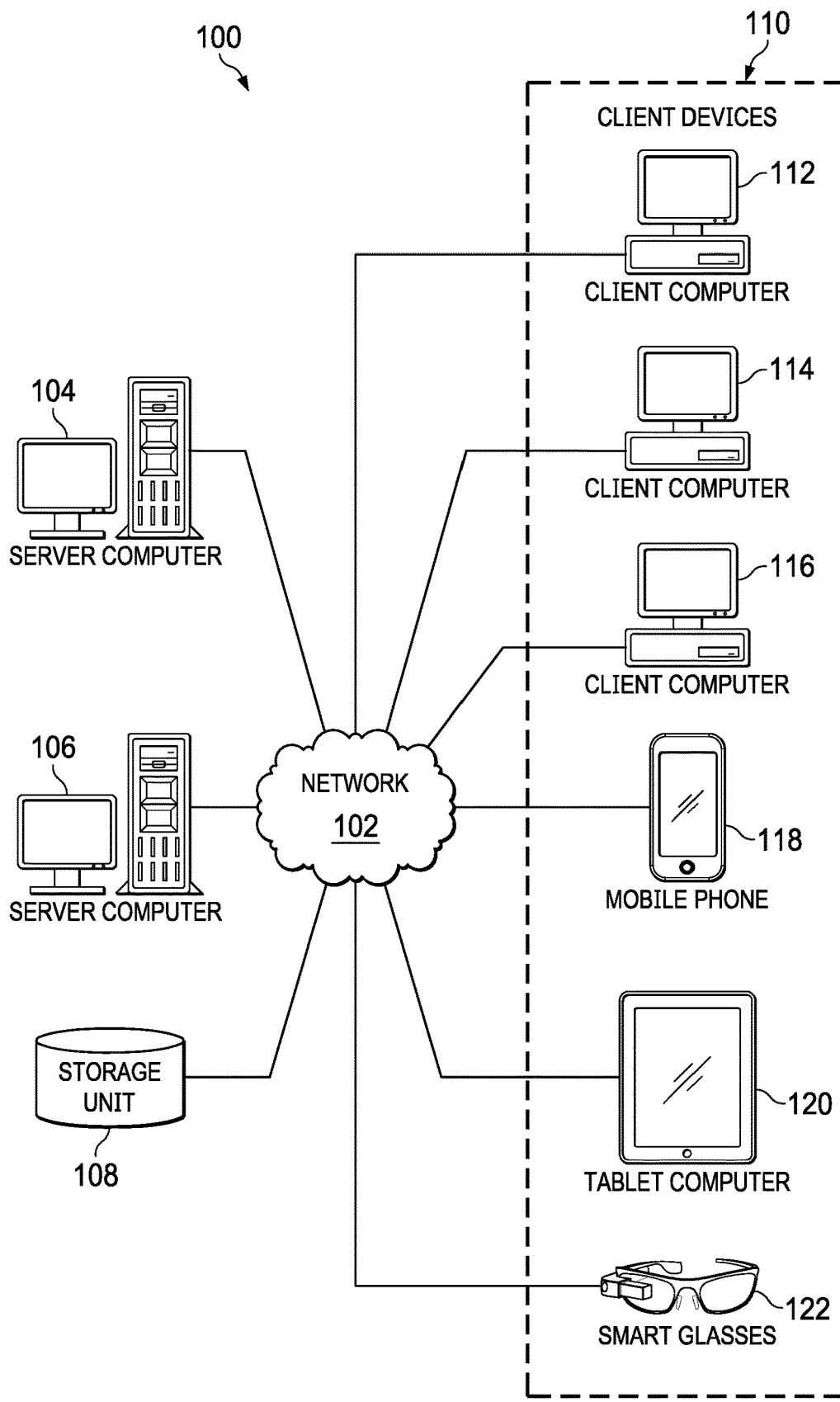
FIG. 1 is a pictorial representation of a network of data processing systems in which illustrative embodiments may be implemented.

The illustrative embodiments recognize and take into account one or more different considerations. For example, the illustrative embodiments recognize and take into account that it may be desirable to have a tool for a user to create and modify expressions that may be converted automatically into program code for implementation in a computer system. In particular, it may be desirable to have a tool for a user to create and modify expressions that define criteria for determining whether an employee of a business or other organization is included in a particular group. Illustrative embodiments also recognize and take into account that current tools for creating and editing expressions may be improved to increase the ease and flexibility of use of such tools.

Current systems and methods for creating and maintaining expressions may be relatively rigid. For example, in current systems and methods, an expression may be created in a grid-like format, in which the user builds an expression line by line. Current systems and methods for building expressions are not flexible. For example, in current systems and methods the components of an expression may not be moved around to change the order of components within the expression.

The illustrative embodiments provide an apparatus, method implemented in a computer system, and computer program product that overcomes the limitations of current systems and methods for building expressions. For example, without limitation, illustrative embodiments may be used to create and manage expressions to define the eligibility of an employee to be included in a compensation or performance plan or another appropriate group. Illustrative embodiments provide a more simple and flexible way for a user to build and manage complex expressions by providing a graphical user interface that allows the user to create, edit, delete, and validate expressions. In accordance with an illustrative embodiment, the entire process of creating an expression may be performed by a user on one displayed screen.

The illustrative embodiments provide various tools for a user to effectively and efficiently create and manage expressions that define criteria for being included in a group. In accordance with an illustrative embodiment, a new rule set of expressions may be created from scratch or may be based on an existing rule set by copying the expressions for the existing rule set into the new rule set. Illustrative embodiments may provide a tool for importing data from an external source to define expressions for groups and hierarchies of groups. Illustrative embodiments also may provide for the creation of custom expressions that may be used as building blocks in the creation of other expressions. Illustrative embodiments may provide tools for validating expressions to ensure that the criteria defined by the expressions are correct. Illustrative embodiments also may provide a transaction log to filter and track changes to expressions over time. Illustrative embodiments also may provide for implementing rule sets of expressions in a test environment and in a production environment.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

As used herein, "a number of" when used with reference to items, means one or more items. For example, "a number of different types of networks" is one or more different types of networks.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. As depicted, client devices 110 include client computer 112, client computer 114, and client computer 116. Client devices 110 can be, for example, computers, workstations, or network computers. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

Network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
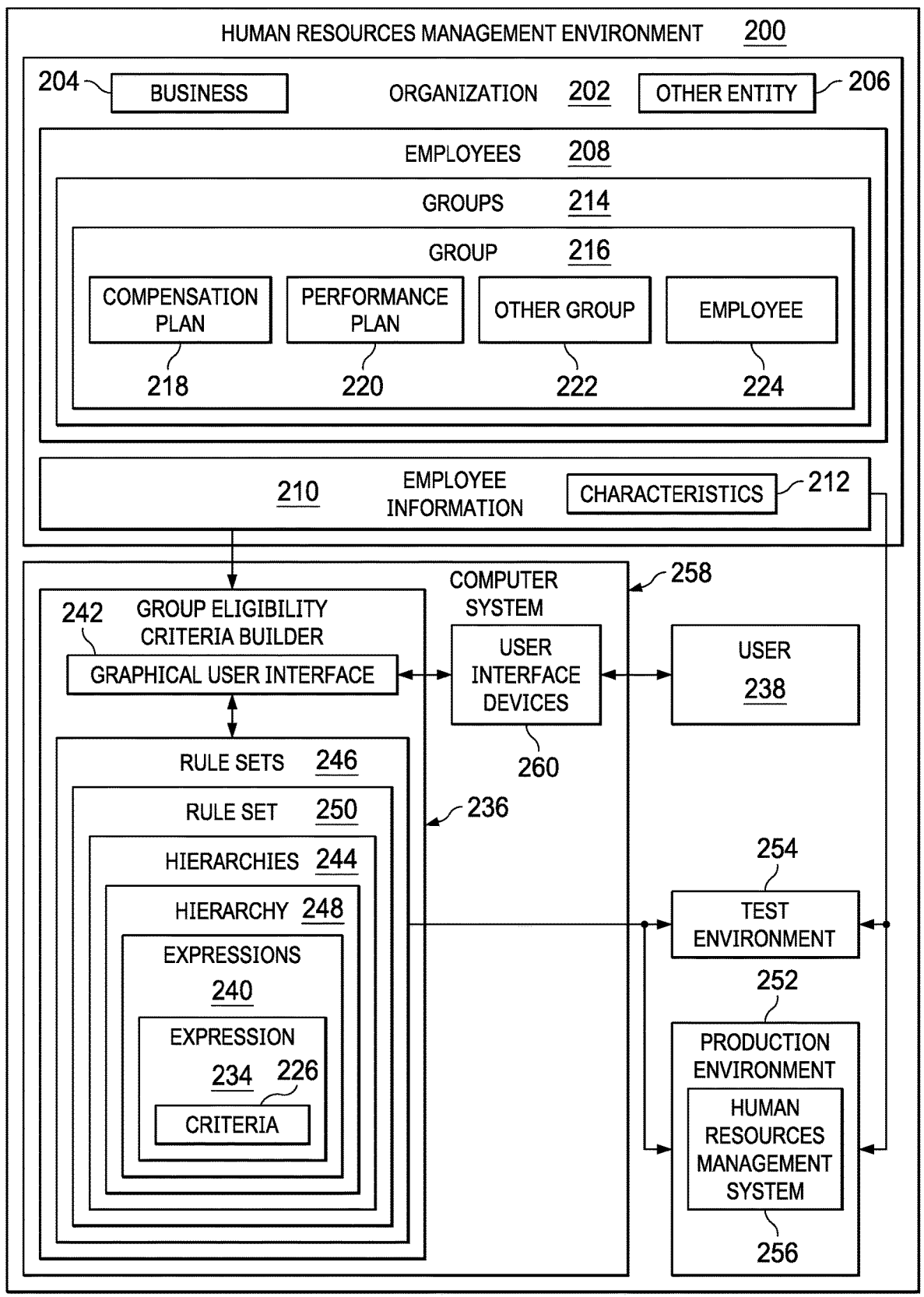
FIG. 2 is an illustration of a block diagram of a human resources management environment in accordance with an illustrative embodiment.

Turning to FIG. 2, an illustration of a block diagram of a human resources management environment is depicted in accordance with an illustrative embodiment. Human resources management environment 200 may include any environment in which one or more systems and methods are used to manage the human resources of any appropriate number of organizations, such as organization 202. For example, without limitation, organization 202 may be business 204. Alternatively, organization 202 may be a governmental, charitable, educational, religious, or military organization or any appropriate other entity 206.

The human resources of organization 202 includes employees 208. In this application, including in the claims, employees 208 are not limited to individuals who may be considered employees of organization 202 under any legal definition of the term in any jurisdiction. Rather, employees 208 may include any individuals who provide any appropriate services to or by organization 202.

Organization 202 may gather and maintain employee information 210 for employees 208. Employee information 210 may be maintained by organization 202, or by a third party for organization 202, in any appropriate database or data structure. Employee information 210 may include any appropriate information regarding various characteristics 212 of employees 208. For example, without limitation, employee information 210 may include personal information about employees 208, information related to positions held by employees 208 in organization 202, other appropriate information, or any appropriate combination of information.

Employees 208 may include various groups 214 of employees 208. Each group 216 in groups 214 of employees 208 may include an appropriate subset of employees 208 of organization 202 that share certain characteristics 212. For example, without limitation, group 216 may be a subset of employees 208 of organization 202 that are included in a specific compensation plan 218, performance plan 220, or other group 222.

Whether any particular employee 224 in employees 208 of organization 202 is included in a particular group 216 may be determined by rules that define criteria 226 for employee 224 being included in group 216. For example, criteria 226 may specify characteristics 212 of employee 224 in employee information 210 that must be satisfied for employee 224 to be included in group 216. Required characteristics 212 of employees 208 for being included in various different groups 214 may be defined by various different criteria 226. In other words, eligibility for being included in each group 216 in groups 214 may be defined by specific criteria 226 for each group 216. In accordance with an illustrative embodiment, criteria 226 for being included in particular group 216 in groups 214 may be defined by expression 234.

In accordance with an illustrative embodiment, group eligibility criteria builder 236 provides various tools for user 238 to effectively and efficiently create and manage expressions 240 that define criteria 226 for being included in various groups 214. For example, without limitation, group eligibility criteria builder 236 may include graphical user interface 242 that provides a relatively easy to use and flexible tool for user 238 to create and manage expressions 240 hierarchies 244, and rule sets 246. As will be described in more detail below, graphical user interface 242 may be used for creating, editing, deleting, validating, and activating expressions 240, hierarchies 244, and rule sets 246. For example, without limitation, each hierarchy 248 in hierarchies 244 may include a plurality of expressions 240 defining criteria 226 for a plurality of groups 214 that may be activated together. Each rule set 250 in rule sets 246 may include one or more hierarchies 244.

Group eligibility criteria builder 236 may be configured to activate expressions 240 for use in production environment 252, test environment 254, or production environment 252 and test environment 254. Group eligibility criteria builder 236 also may be configured to transfer expressions 240 between production environment 252 and test environment 254. For example, without limitation, production environment 252 may include human resources management system 256 or any other appropriate system or environment in which expressions 240 created and maintained by group eligibility criteria builder 236 may be activated and used. Expressions 240 may be used in human resources management system 256 in combination with employee information 210 to identify employees 208 of organization 202 that are included in particular groups 214, so that appropriate human resources functions may be performed for employees 208, or for any other appropriate purpose.

Expressions 240 may be activated in test environment 254 to confirm that expressions 240 define eligibility for being included in groups 214 correctly before expressions 240 are activated for use in production environment 252. For example, without limitation, test environment 254 may be a test environment for human resources management system 256.

In this illustrative example, group eligibility criteria builder 236 is implemented using computer system 258. Computer system 258 is a physical hardware system and includes one or more data processing systems. When more than one data processing system is present in computer system 258, those data processing systems are in communication with each other using a communications medium. The communications medium can be a network. The data processing systems can be selected from at least one of a computer, a server computer, a tablet computer, or some other suitable data processing system. For example, group eligibility criteria builder 236 may be implemented in computer system 258 implemented in network data processing system 100 in FIG. 1.

Group eligibility criteria builder 236 may be implemented in computer system 258 that is operated by or for organization 202 or another appropriate entity. Group eligibility criteria builder 236 may be implemented in computer system 258 along with human resources management system 256. For example, without limitation, some or all of the functionality of group eligibility criteria builder 236 as described herein may be implemented as part of human resources management system 256 or separate from human resources management system 256 but in communication with human resources management system 256 in any appropriate manner.

User 238 may be any appropriate human operator of group eligibility criteria builder 236. User 238 may interact with group eligibility criteria builder 236 via graphical user interface 242 and any appropriate user interface devices 260 for interaction with graphical user interface 242. User interface devices 260 may include any appropriate output devices, such as displays, and any appropriate user input devices, such as a computer mouse, track ball, stylus, voice recognition device, or the like. Alternatively, or in addition, user interface devices 260 may include a device that combines user input and output functionality together in a single device, such as a touch screen display device. User interface devices 260 may be part of computer system 258 or configured to be connected to computer system 258 to operate with computer system 258 in an appropriate manner.

The illustration of the different components in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
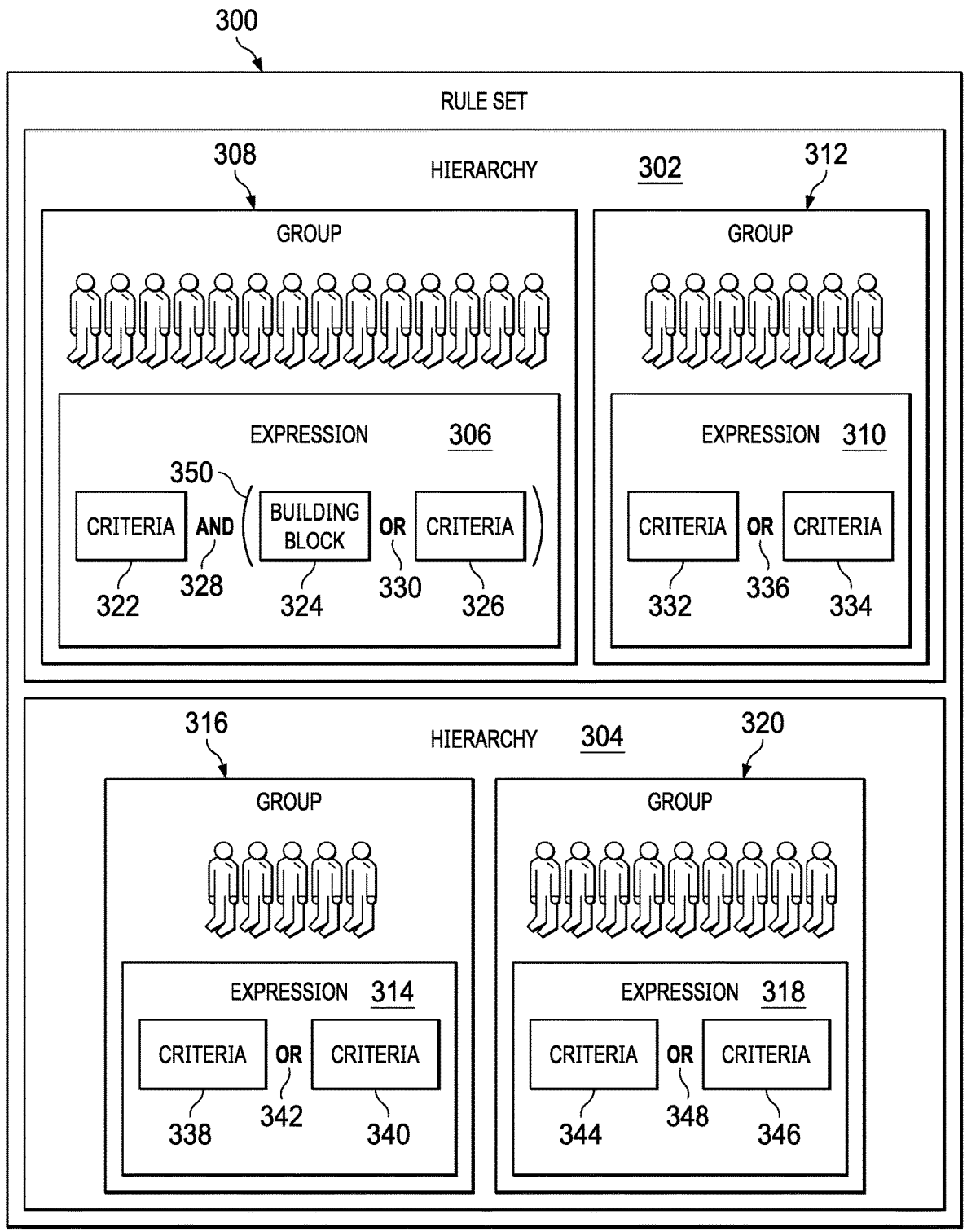
FIG. 3 is an illustration of a rule set of group eligibility criteria in accordance with an illustrative embodiment.

Turning to FIG. 3, an illustration of a rule set of group eligibility criteria is depicted in accordance with an illustrative embodiment. Rule set 300 is an example of rule set 250 that may be created using group eligibility criteria builder 236 in FIG. 2.

In this example, rule set 300 includes expressions that define eligibility for groups in hierarchy 302 and hierarchy 304. A rule set created and maintained in accordance with an illustrative embodiment may include only one hierarchy or may include more than two hierarchies.

Hierarchy 302 includes expression 306 defining eligibility for group 308 and expression 310 defining eligibility for group 312. Hierarchy 304 includes expression 314 defining eligibility for group 316 and expression 318 defining eligibility for group 320. A hierarchy in accordance with an illustrative embodiment may include only one expression defining eligibility for one group or may include more than two expressions defining eligibility for more than two groups.

Expression 306 includes criteria 322, 324, and 326 joined by logical operators 328 and 330. Expression 310 includes criteria 332 and 334 joined by logical operator 336. Expression 314 includes criteria 338 and 340 joined by logical operator 342. Expression 318 includes criteria 344 and 346 joined by logical operator 348. Expressions in accordance with an illustrative embodiment may include any appropriate number of criteria joined by any appropriate number of logical operators.

Criteria 322, 324, 326, 332, 334, 338, 340, 344, and 346 may be defined in any appropriate manner. For example, without limitation, each of criteria 322, 324, 326, 332, 334, 338, 340, 344, and 346 may be defined as a property, a value for the property, and an operator that associates the value with the property.

In this example, criteria 324 is defined using a building block. A building block is a portion of an expression including criteria that may be created and saved for use in multiple expressions. When the criteria in a building block is changed, the same change may be made automatically in each expression that uses the building block to define criteria for the expression.

Logical operators 328 and 342 are the conjunction logical operator, AND. Logical operators 336 and 348 are the disjunction logical operator, OR. Logical operators in expressions in accordance with an illustrative embodiment may include logical operators other than AND and OR.

In this example, criteria 324 and 326 joined by logical operator 330 form nested expression 350 within expression 306. A nested expression in accordance with an illustrative embodiment may include any appropriate number of criteria joined by any appropriate number of logical operators.

Figure 4:
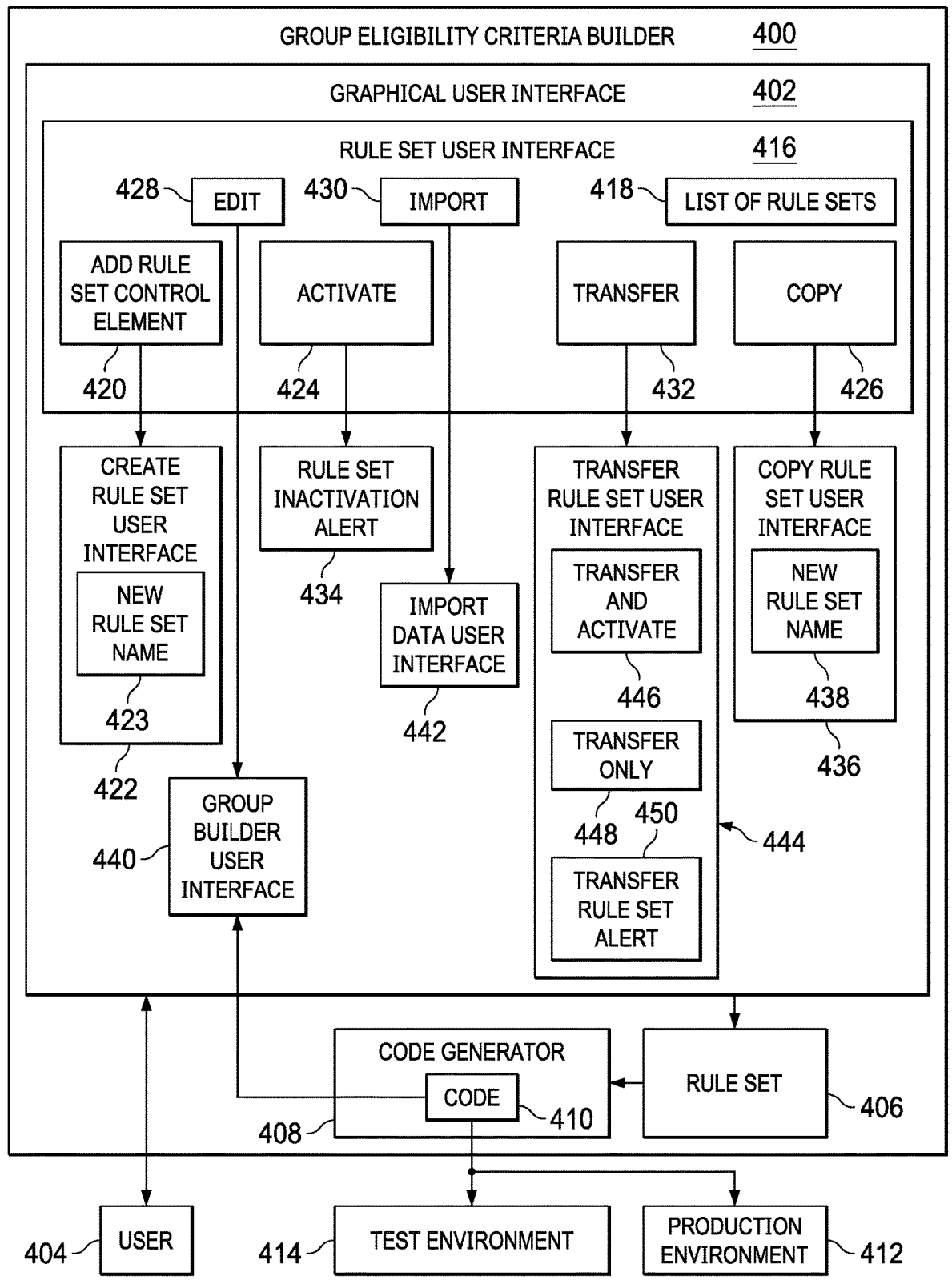
FIG. 4 is an illustration of a block diagram of a group eligibility criteria builder in accordance with an illustrative embodiment.

Turning to FIG. 4, an illustration of a block diagram of a group eligibility criteria builder is depicted in accordance with an illustrative embodiment. Group eligibility criteria builder 400 is an example of one implementation of group eligibility criteria builder 236 in FIG. 2.

Group eligibility criteria builder 400 is configured to generate graphical user interface 402. User 404 interacts with graphical user interface 402 to create rule set 406 including expressions that define groups.

Group eligibility criteria builder 400 also may include code generator 408. Code generator 408 is configured to generate code 410 from rule set 406. Code 410 may include any appropriate program code for implementing the expressions in rule set 406 for use in any appropriate device or system. Group eligibility criteria builder 400 may be configured to send code 410 implementing rule set 406 to production environment 412 for use or to test environment 414 for testing before being sent to production environment 412 for use.

Graphical user interface 400 may be configured to include rule set user interface 416. Rule set user interface 416 includes an interactive list of rule sets 418 that have been created. For example, without limitation, each rule set in list of rule sets 418 may be identified in rule set user interface 416 by a name of the rule set, the creator of the rule set, and a creation date of the rule set.

Rule set user interface 416 may include add rule set control element 420. In response to selecting add rule set control element 420 by user 404, create rule set user interface 422 may be displayed. Create rule set user interface 422 may prompt user 404 to enter new rule set name 423 for a new rule set to be created. Create rule set user interface 422 is configured to receive new rule set name 423 for a new rule set as entered by user 404. In response to receiving new rule set name 423 from user 404, a new rule set with new rule set name 423 entered by user 404 is displayed in list of rule sets 418. In this case, the new rule set with new rule set name 423 may be created without any rules defined by any expressions.

In response to selecting one of the rule sets listed in list of rule sets 418, a menu of control elements to activate 424, copy 426, edit 428, import 430, and transfer 432 the selected rule set may be displayed.

In response to selecting the control element to activate 424 a selected rule set by user 404, the selected rule set may be activated in production environment 412 or test environment 414. Only one rule set may be active in production environment 412 or test environment 414 at a time. Therefore, rule set inactivation alert 434 may be displayed in response to selecting the control element to activate 424 the selected rule set. Rule set inactivation alert 434 may be implemented in any appropriate manner to warn user 404 that the rule set that is currently active in production environment 412 or test environment 414 will be inactivated when the selected rule set is activated. Rule set inactivation alert 434 may prompt user 404 to confirm activation of the selected rule set. The selected rule set may be activated in production environment 412 or test environment 414 in response to receiving confirmation from user 404 to activate the selected rule set.

The control element to copy 426 a selected rule set may be selected by user 404 to create a new rule set based on an existing rule set. In response to selecting the control element to copy 426 a selected rule set, copy rule set user interface 436 may be displayed. Copy rule set user interface 436 may prompt user 404 to enter new rule set name 438 for a new rule set to be created. Copy rule set user interface 436 is configured to receive new rule set name 438 for a new rule set as entered by user 404. In response to receiving new rule set name 438 from user 404, a new rule set with new rule set name 438 is displayed in list of rule sets 418. In this case, the new rule set with new rule set name 438 is created having the same rules defined by the same expressions as the selected rule set. In other words, the new rule set is a copy of the selected rule set.

In response to selecting the control element to edit 428 a selected rule set by user 404, group builder user interface 440 may be displayed. Group builder user interface 440 may be configured to provide tools for user 404 to create and edit expressions defining the rules for the selected rule set. An example of one implementation of group builder user interface 440 will be described in more detail below with reference to FIG. 5.

In response to selecting the control element to import 430 for a selected rule set by user 404, import data user interface 442 may be displayed. Import data user interface 442 may be configured to prompt user 404 to identify a source of data, such as a file, from which data will be imported into the selected rule set. For example, without limitation, the source of data may be a comma-separated values, CSV, file, or a file containing data in another appropriate format. The data in the identified file may include expressions defining one or more groups, information defining one or more hierarchies of groups, other appropriate data, or any appropriate combination of various different types of data. Import data user interface 442 is configured to receive the identification of the file or other source of data as entered by user 404. In response to receiving the identification of the source of data from user 404, the data from the identified source of data is imported into the selected rule set.

In response to selecting the control element to transfer 432 a selected rule set by user 404, transfer rule set user interface 444 may be displayed. Transfer rule set user interface 444 may prompt user 404 to select a control element to transfer and activate 446 the selected rule set or a control element to transfer only 448 the selected rule set. In response to selecting the control element to transfer and activate 446 the selected rule set, the selected rule set may be sent to production environment 412 or test environment 414 and activated in production environment 412 or test environment 414. In response to selecting the control element to transfer only 448 the selected rule set, the selected rule set may be sent to production environment 412 or test environment 414 without being activated in production environment 412 or test environment 414.

Transfer rule set alert 450 also may be displayed in response to selecting the control element to transfer 432 a selected rule set by user 404. Transfer rule set alert 450 may be implemented in any appropriate manner to warn user 404 that any rule set in production environment 412 or test environment 414 that has the same name as the selected rule set to be transferred to production environment 412 or test environment 414 will be replaced. Transfer rule set alert 450 may prompt user 404 to confirm the transfer of the selected rule set. The selected rule set may be sent to production environment 412 or test environment 414 in response to receiving confirmation from user 404 to transfer the selected rule set.

The illustration of the different components in FIG. 4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 5A:
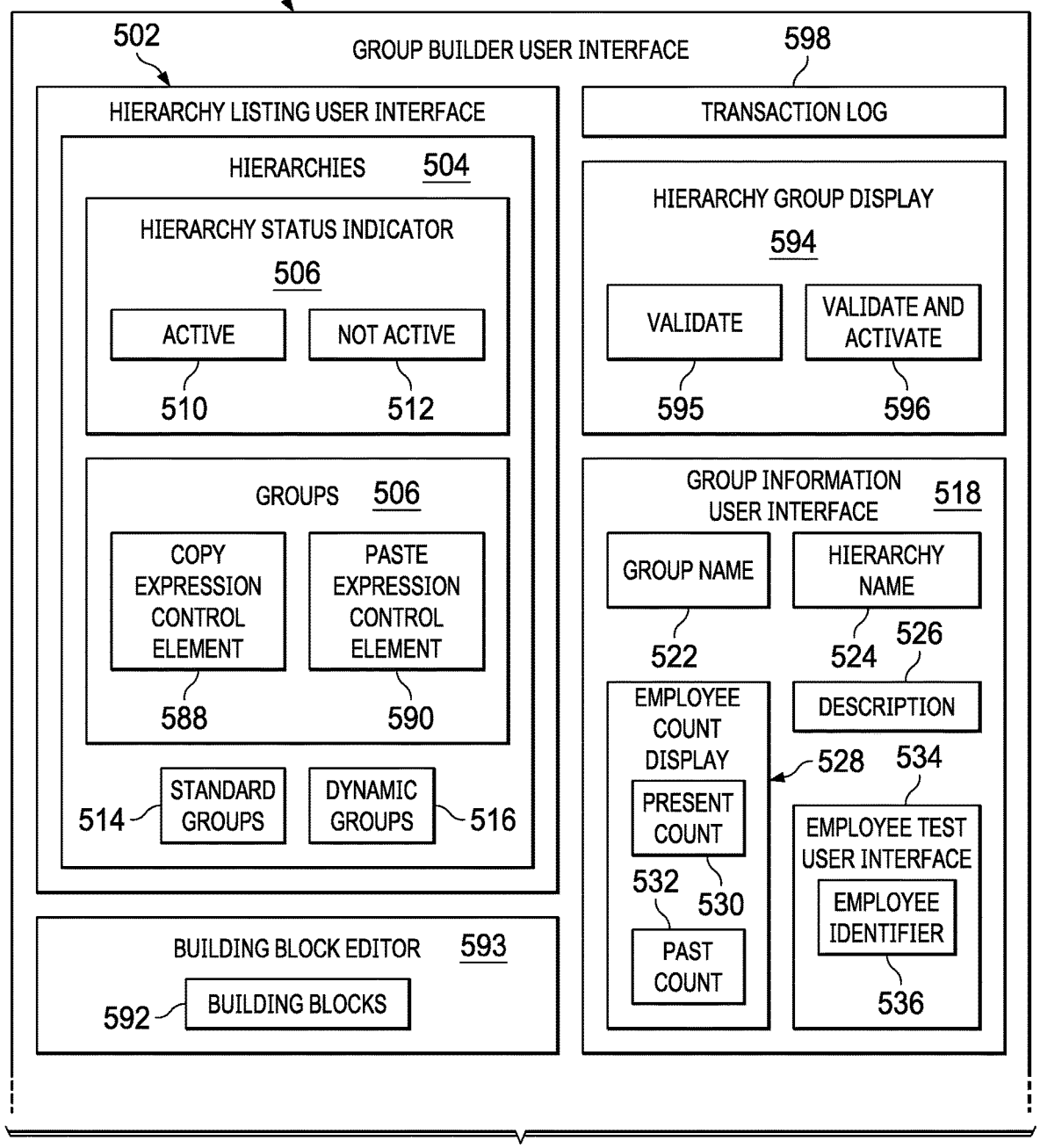
FIG. 5 (comprising FIG. 5A and FIG. 5B) is an illustration of a block diagram of a group builder user interface in a group eligibility criteria builder in accordance with an illustrative embodiment.
Figure 5B:
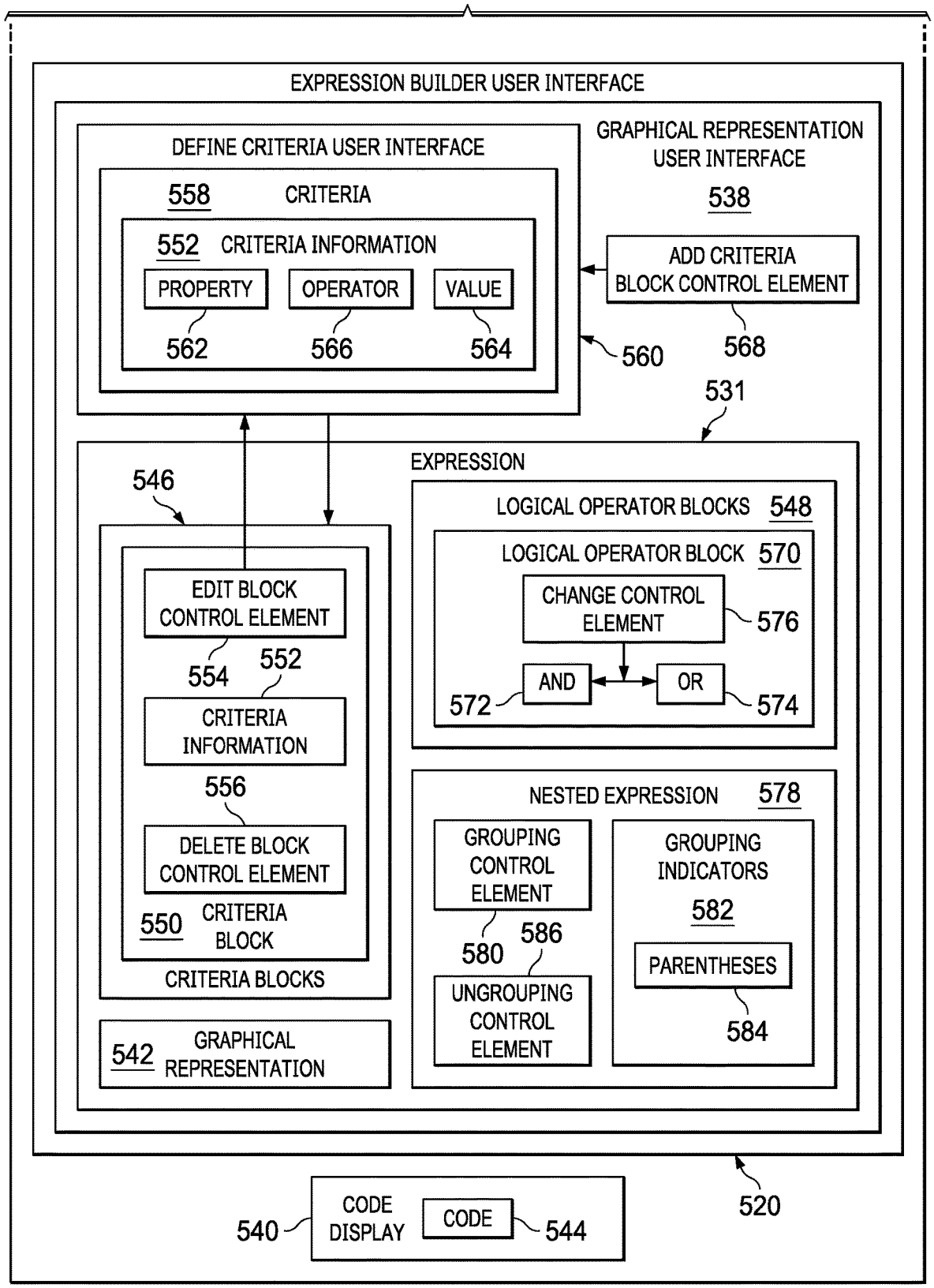

Turning to FIG. 5, an illustration of a block diagram of a group builder user interface in a group eligibility criteria builder is depicted in accordance with an illustrative embodiment. Group builder user interface 500 is an example of one implementation of group builder user interface 440 in group eligibility criteria builder 400 in FIG. 4.

Group builder user interface 500 includes hierarchy listing user interface 502. Hierarchy listing user interface 502 may include an interactive listing of hierarchies 504 and groups 506 within hierarchies 504 for a selected rule set. For example, without limitation, hierarchies 504 may be listed in hierarchy listing user interface 502 by names of hierarchies 504. The names of hierarchies 504 may comprise any appropriate unique identifier for each of hierarchies 504.

Each of hierarchies 504 listed in hierarchy listing user interface 502 may include hierarchy status indicator 508. Hierarchy status indicator 508 may include any appropriate graphical, symbolic, textual, or other appropriate indication of whether the hierarchy is active 510 or not active 512. Hierarchy status indicator 508 for a hierarchy that is active 510 may be changed automatically from active 510 to not active 512 in response to any change in a group that is included in the hierarchy that may be made using group builder user interface 500.

For example, without limitation, groups 506 may be listed in hierarchy listing user interface 502 by names of groups 506. The names of groups 506 may comprise any appropriate unique identifier for each of groups 506. Groups 506 may be listed in hierarchy listing user interface 502 in any appropriate manner to indicate which of groups 506 are included in each of hierarchies 504.

Hierarchies 504 may comprise standard groups 514 or dynamic groups 516. Hierarchies 504 comprising standard groups 514 may be listed separately from hierarchies 504 comprising dynamic groups 516 in hierarchy listing user interface 502.

Standard groups 514 may be defined individually using eligibility rule criteria. Group membership in standard groups 514 may be defined based on multiple eligibility rule criteria. Standard groups 514 may not be automatically updated based on new data. For example, a series of standard groups 514 may be created with eligibility criteria that includes all vice presidents of an organization in different countries. For example, the series of standard groups 514 may include a group for Canada vice presidents and a group for France vice presidents. If a new country is added to the organization, a new standard group may be created by a user for vice presidents in the new country, using the group builder user interface 500 as described herein.

Dynamic groups 516 may be created automatically based on criteria set at the hierarchy level. Group membership in dynamic groups 516 may be based on only one eligibility rule criterion. For example, a dynamic group may be defined in which the name of the group and the eligibility rule criterion for the group is populated from a country list of countries in which an organization has operations. A dynamic group for each country in the country list may be automatically created and updated. If a new country is added to the country list, a new dynamic group for the new country is automatically created.

In response to selecting one of groups 506 in hierarchy listing user interface 502, group information user interface 518 and expression builder user interface 520 for the selected group may be displayed. Group information user interface 518 may display group name 522, hierarchy name 524, and description 526 for the selected group. Group name 522 is the name of the selected group and may comprise any appropriate unique identifier for the selected group. For example, without limitation, group name 522 for the selected group may match the name of the selected group as listed in hierarchy listing user interface 502. Hierarchy name 524 may be the name of the hierarchy to which the selected group belongs and may comprise any appropriate unique identifier for the hierarchy. For example, without limitation, hierarchy name 524 may match the name of the hierarchy in which the selected group is included as listed in hierarchy listing user interface 502. Description 526 may include any appropriate text description of the group. Group information user interface 518 may be configured to allow a user to enter and edit description 526 of the selected group.

Group information user interface 518 may include employee count display 528. Employee count display 528 may include a display of present count 530 of the number of employees in the group defined by expression 531 currently displayed in expression builder user interface 520. Employee count display 528 also may include a display of past count 532 of the number of employees in the group as defined by the expression displayed in expression builder user interface 520 before the most recent change to the expression. Employee count display 528 thus shows a user how a change in the expression defining a group changes the number of employees included in the group. For example, without limitation, the number of employees displayed in employee count display 528 may be determined by applying the present and past expressions for a group to employee information for employees of an organization to identify the employees that are included in the group.

Group information user interface 518 may include employee test user interface 534. Employee test user interface 534 prompts a user to enter employee identifier 536. Employee identifier 536 may include any appropriate information for identifying a selected employee. In response to receiving employee identifier 536 from the user, it is determined whether the employee identified by employee identifier 536 is included in the group as defined by expression 531 currently displayed in expression builder user interface 520 and the user is notified whether or not the selected employee is included in the group.

Expression builder user interface 520 includes graphical representation user interface 538 and code display 540. Graphical representation user interface 538 and code display 540 preferably are displayed at the same time on the same display screen. Graphical representation user interface 538 includes graphical representation 542 of expression 531 for the selected group. Code display 540 includes a display of code 544 for implementing expression 531 displayed in graphical representation user interface 538. Code 544 is preferably automatically generated for expression 531 displayed in graphical representation user interface 538. Code 544 preferably may not be edited by a user. All editing of expression 531 by a user is performed in expression builder user interface 520.

Graphical representation 542 of expression 531 includes criteria blocks 546 and logical operator blocks 548. Each criteria block 550 in criteria blocks 546 includes criteria information 552, edit block control element 554, and delete block control element 556. Criteria information 552 includes information defining criteria 558 of criteria block 550.

In response to selecting edit block control element 554 for a selected criteria block 550, define criteria user interface 560 is displayed. Define criteria user interface 560 prompts a user to edit current criteria information 552 defining criteria 558 for the selected criteria block 550. Criteria information 552 may include information identifying property 562, value 564 for property 562, and operator 566 indicating a relationship of value 566 to property 562. For example, without limitation, property 562 may be a date, a string of characters, a true or false indicator, or any other appropriate property. Value 564 is any appropriate value for the corresponding property 562. For example, a specific calendar date is an appropriate value for a date property. Operator 566 is any appropriate operator for defining a relationship between the corresponding property 562 and value 564. Examples of operator 566 include, without limitation: starts with, ends with, contains, greater than, less than, equal to, not equal to, is not null, greater than or equal to, or any other appropriate operator.

In response to a user selecting delete block control element 556 for the selected criteria block 550, the selected criteria block 550 is deleted from graphical representation 542 of expression 531.

Graphical representation user interface 538 may include add criteria block control element 568 for adding a new criteria block 550 to expression 531. In response to selecting add criteria block control element 568, define criteria user interface 560 is displayed. Define criteria user interface 560 prompts the user to select or enter criteria information 552 to define criteria 558 for the new criteria block 550. In response to receiving criteria information 552 for the new criteria block 550 from the user via define criteria user interface 560, the new criteria block 560 is added to graphical representation 542 of expression 531. For example, without limitation, the new criteria block 550 may be added to the end of graphical representation 542 of expression 531 and connected thereto by a default logical operator block 570.

Each logical operator block 570 in logical operator blocks 570 may be an AND 572 or an OR 574 logical operator. Each logical operator block 570 also may include change control element 576. In response to selecting change control element 576 for logical operator block 570 by a user, logical operator block 570 comprising AND 572 logical operator is changed to logical operator block 570 comprising OR 574 logical operator and logical operator block 570 comprising OR 574 logical operator is changed to logical operator block 570 comprising AND 572 logical operator.

Grouping control element 580 may be displayed in response to a user selecting a plurality of criteria blocks 546 in graphical representation user interface 538. In response to selecting grouping control element 580 by the user, the selected criteria blocks 546 are grouped to form nested expression 578 within expression 531. Grouping indicators 582 are displayed in graphical representation 542 of expression 531 to indicate the grouping of criteria blocks 546 forming nested expression 578. For example, without limitation, grouping indicators 582 may comprise parentheses 584. Ungrouping control element 586 may be displayed in response to the user selecting the grouping of criteria blocks 546 forming nested expression 578. In response to the user selecting ungrouping control element 586, the criteria blocks 546 forming nested expression 578 are ungrouped and grouping indicators 582 are removed from graphical representation 542.

An expression from one of groups 506 listed in hierarchy listing user interface 502 may be copied in response to selecting copy expression control element 588 for the selected group. The copied expression may then be added into graphical representation 542 of expression 531 for another group as displayed in graphical representation user interface 538 by selecting paste expression control element 590.

Building blocks 592 are reusable expressions that can be inserted into the expressions for groups 506. For example, without limitation, building blocks 592 may be used to represent commonly used expressions or complex expressions that may be used more than once.

Group builder user interface 500 may include building block editor 593. Building block editor 593 may be configured for creating and editing building blocks 592. Building block editor 593 may be configured for creating and editing building blocks 592 by a user in essentially the same manner and using essentially the same user interfaces as described herein for creating and editing expressions for groups 506. Building blocks 592 that are created using building block editor 593 are stored and may be listed in group builder user interface 500 in a manner similar to groups 506.

Expressions created as building blocks 592 may be added to expressions for any number of groups 506. For example, without limitation, while expression 531 for a group is being edited in graphical representation user interface 538, a building block may be added to expression 531 for the group by dragging an identifier for the building block from a list of building blocks 592 in hierarchy listing user interface 502 into graphical representation user interface 538.

In response to making a change to a building block, the same change will be made automatically in the expressions for any groups 506 that use the changed building block. Preferably, building blocks may be deleted only when not in use in the expressions for any groups. In response to an attempt by a user to delete a building block that is in use, an alert may be displayed to inform the user that the deletion cannot be completed. The alert also may identify the groups in which the building is used.

Hierarchy group display 594 may be displayed in group builder user interface 500 in response to selecting a hierarchy from hierarchies 504 listed in hierarchy listing user interface 502. Hierarchy group display 594 may be configured to display a listing of the groups in the selected hierarchy, group descriptions, and the number of employees in each group.

The selected hierarchy may be validated in response to selecting a control element to validate 595 in hierarchy group display 594. Alternatively, the selected hierarchy may be validated and automatically activated in response to selecting a control element to validate and activate 596 in hierarchy group display 594.

Transaction log information preferably is stored for each transaction that is performed using group builder user interface 500. This transaction log information may be displayed in transaction log 598 in group builder user interface 500.

The illustration of the different components in FIG. 5 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Turning to FIG. 6, an illustration of a rule set user interface in a group eligibility criteria builder is depicted in accordance with an illustrative embodiment. Rule set user interface 600 is an example of one implementation of rule set user interface 416 in FIG. 4.

Rule set user interface 600 includes an interactive list of rule sets 602 that have been created. Rule set user interface 600 includes control element 604 to add a new rule set to list of rule sets 602. In response to selecting one of the rule sets listed in list of rule sets 602, menu 606 of control elements to activate, copy, edit, import to, and transfer the selected rule set may be displayed.

Figure 7:
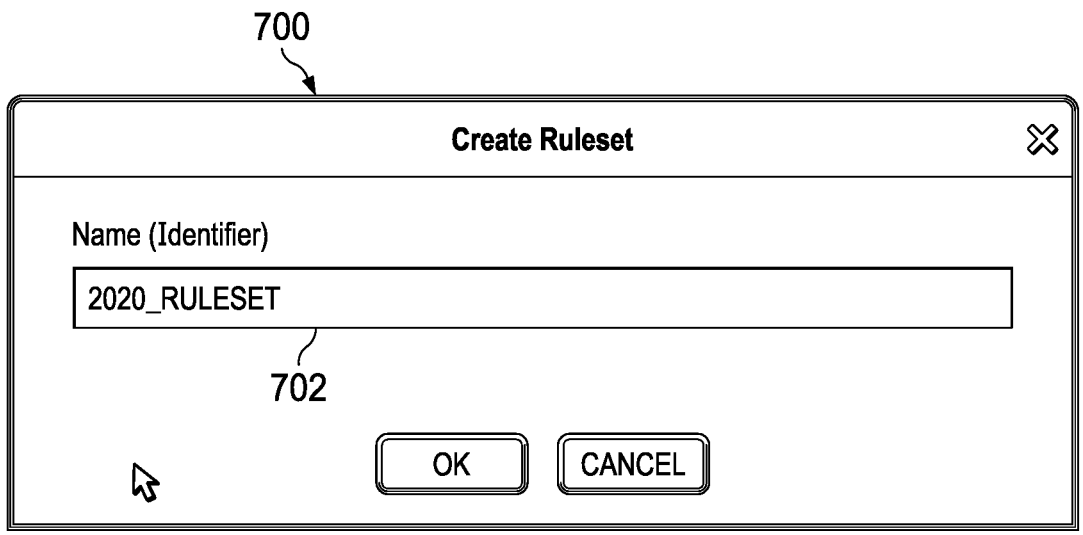
FIG. 7 is an illustration of a create rule set user interface in a group eligibility criteria builder in accordance with an illustrative embodiment.

Turning to FIG. 7, an illustration of a create rule set user interface in a group eligibility criteria builder is depicted in accordance with an illustrative embodiment. Create rule set user interface 700 is an example of one implementation of create rule set user interface 422 in FIG. 4. Create rule set user interface 700 may be displayed in response to selecting control element 604 to add a new rule set in rule set user interface 600 in FIG. 6. Create rule set user interface 700 prompts a user to enter a name 702 for a new rule set.

Figure 8:
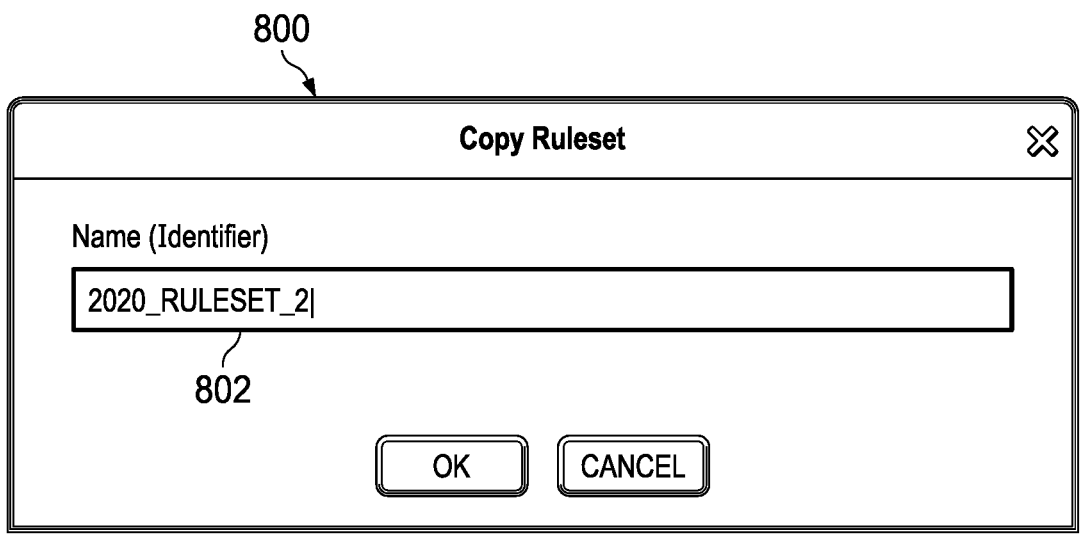
FIG. 8 is an illustration of a copy rule set user interface in a group eligibility criteria builder in accordance with an illustrative embodiment.

Turning to FIG. 8, an illustration of a copy rule set user interface in a group eligibility criteria builder is depicted in accordance with an illustrative embodiment. Copy rule set user interface 800 is an example of one implementation of copy rule set user interface 436 in FIG. 4. Copy rule set user interface 800 may be displayed in response to selecting "Copy" from menu 606 in rule set user interface 600 in FIG. 6. Copy rule set user interface 800 prompts a user to enter a name 802 for a new rule set. The content of the new rule set will be copied from the rule set selected in rule set user interface 600 to open menu 606 in FIG. 6.

Figure 9:
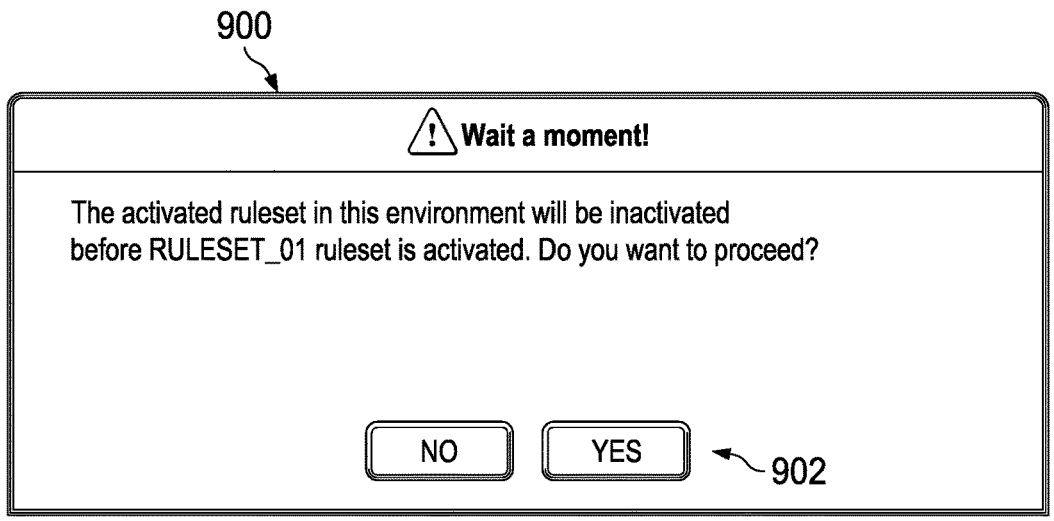
FIG. 9 is an illustration of a rule set inactivation alert in a group eligibility criteria builder in accordance with an illustrative embodiment.

Turning to FIG. 9, an illustration of a rule set inactivation alert in a group eligibility criteria builder is depicted in accordance with an illustrative embodiment. Rule set inactivation alert 900 is an example of one implementation of rule set inactivation alert 434 in FIG. 4. Rule set inactivation alert 900 may be displayed in response to selecting "Activate" from menu 606 for a selected rule set in rule set user interface 600 in FIG. 6. Rule set inactivation alert 900 informs a user that a currently activated rule set will be inactivated if the selected rule set is activated. Rule set inactivation alert 900 also prompts the user to select a control element 902 to confirm proceeding with the activation of the selected rule set or not.

Figure 10:
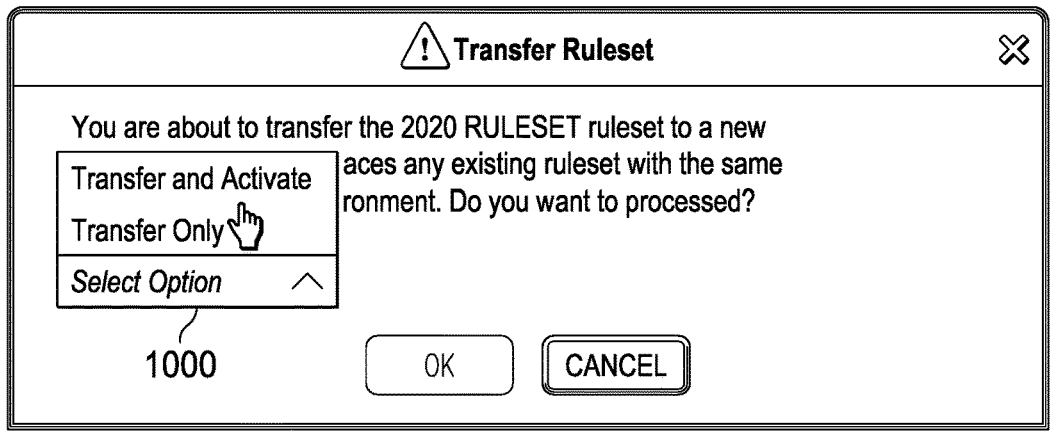
FIG. 10 is an illustration of a transfer rule set user interface in a group eligibility criteria builder in accordance with an illustrative embodiment.

Turning to FIG. 10, an illustration of a transfer rule set user interface in a group eligibility criteria builder is depicted in accordance with an illustrative embodiment. Transfer rule set user interface 1000 is an example of one implementation of transfer rule set user interface 444 in FIG. 4. Transfer rule set user interface 1000 may be displayed in response to selecting "Transfer" from menu 606 for a selected rule set in rule set user interface 600 in FIG. 6. Transfer rule set user interface 1000 prompts a user to select from either transferring and activating the selected rule set or only transferring the selected rule set.

Figure 11:
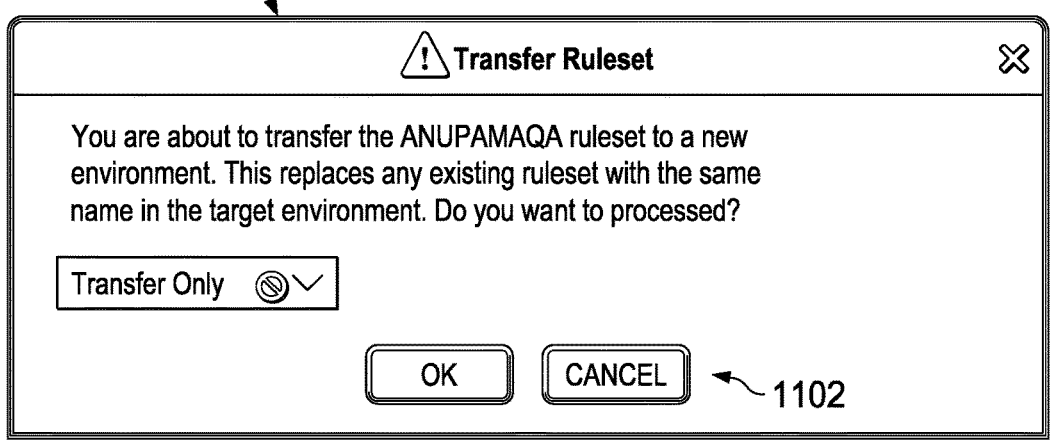
FIG. 11 is an illustration of a transfer rule set alert in a group eligibility criteria builder in accordance with an illustrative embodiment.

Turning to FIG. 11, an illustration of a transfer rule set alert in a group eligibility criteria builder is depicted in accordance with an illustrative embodiment. Transfer rule set alert 1100 is an example of one implementation of transfer rule set alert 450 in FIG. 4. Transfer rule set alert 1100 may be displayed in response to selecting "Transfer" from menu 606 for a selected rule set in rule set user interface 600 in FIG. 6. Transfer rule set alert 1100 informs a user that transferring the selected rule set to a production environment or a test environment will replace any existing rule set with the same name in that environment. Transfer rule set alert 1100 also prompts the user to select a control element 1102 to confirm proceed with the transfer of the selected rule set or not.

Figure 12:
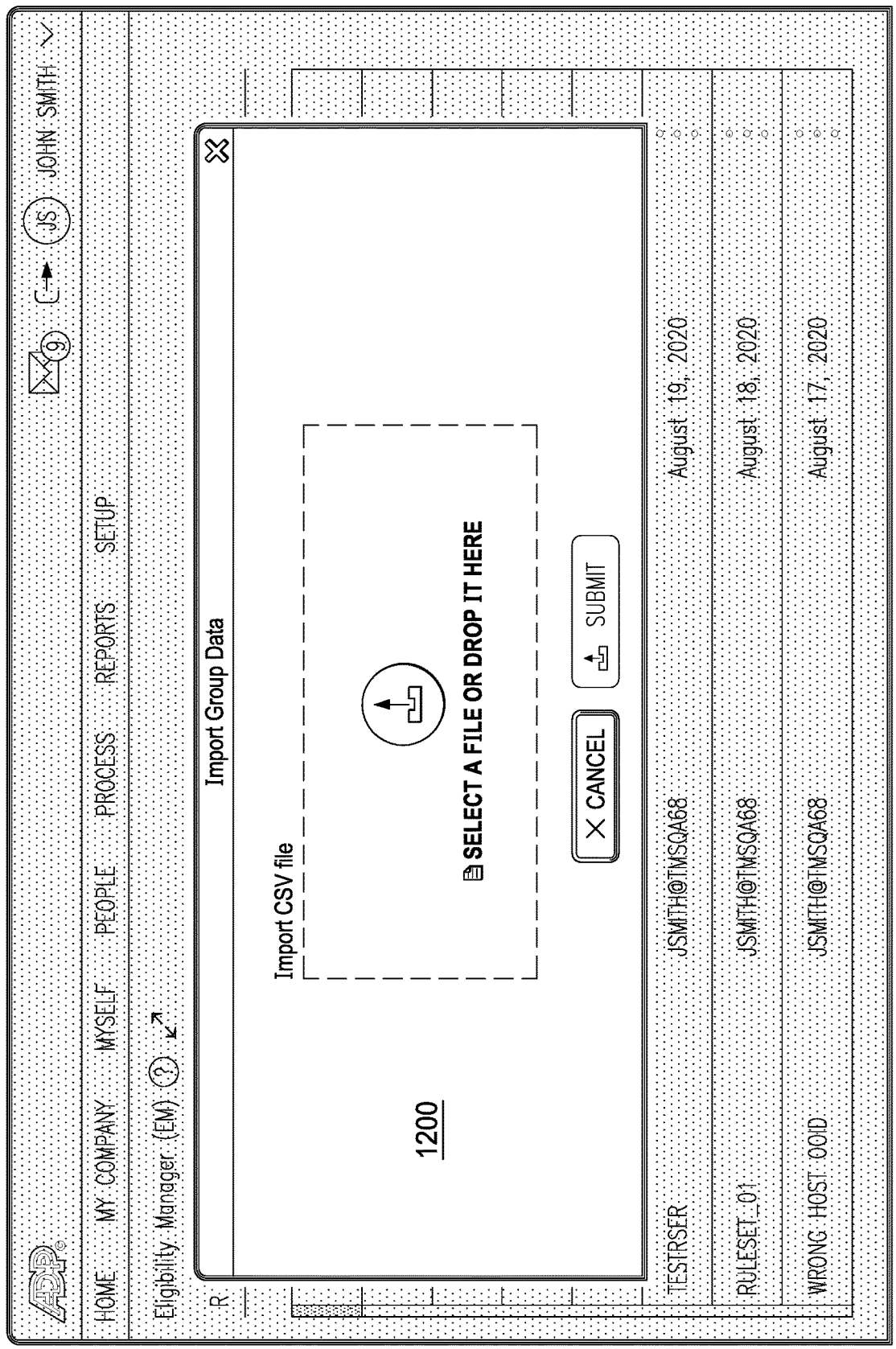
FIG. 12 is an illustration of an import data user interface in a group eligibility criteria builder in accordance with an illustrative embodiment.

Turning to FIG. 12, an illustration of an import data user interface in a group eligibility criteria builder is depicted in accordance with an illustrative embodiment. Import data user interface 1200 is an example of one implementation of import data user interface 442 in FIG. 4. Import data user interface 1200 may be displayed in response to selecting "Import" from menu 606 for a selected rule set in rule set user interface 600 in FIG. 6.

Figure 13:
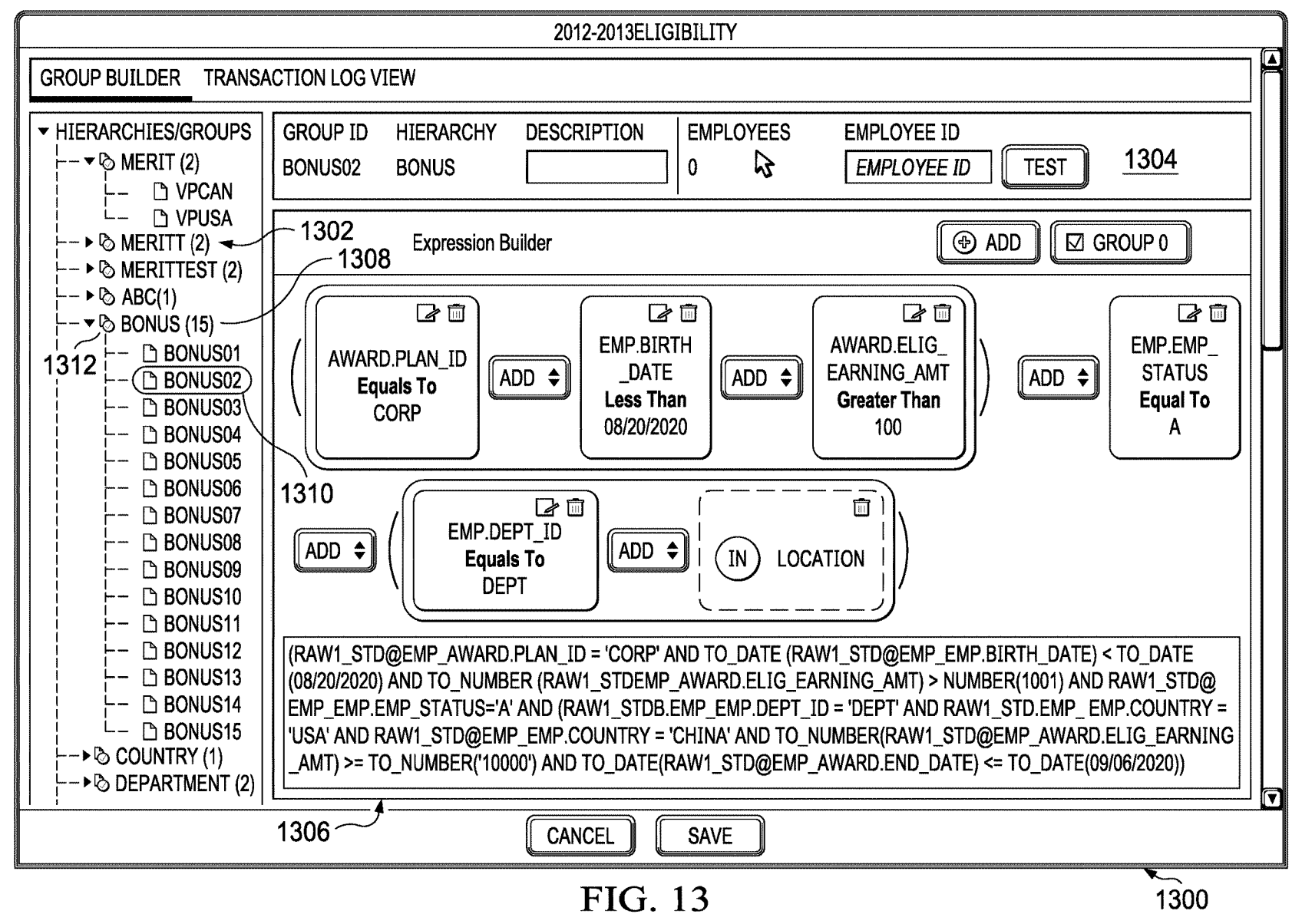

Turning to FIG. 13, an illustration of a group builder user interface in a group eligibility criteria builder is depicted in accordance with an illustrative embodiment. Group builder user interface 1300 is an example of one implementation of group builder user interface 500 in FIG. 5. Group builder user interface 1300 may be displayed in response to selecting "Edit" from menu 606 for a selected rule set in rule set user interface 600 in FIG. 6. Group builder user interface 1300 includes hierarchy listing user interface 1302, group information user interface 1304, and expression builder user interface 1306.

Hierarchy listing user interface 1302 includes an interactive listing of hierarchies 1308 and groups 1310 within hierarchies 1308 for the selected rule set. Each of hierarchies 1308 is listed in hierarchy listing user interface 1302 by name of the hierarchy. The number of groups in hierarchy 1308 is indicated by a number in parentheses next to the name of hierarchy 1308. Hierarchy status indicator 1312 next to the name of hierarchy 1308 indicates whether hierarchy 1308 is active or not active.

Figure 14:
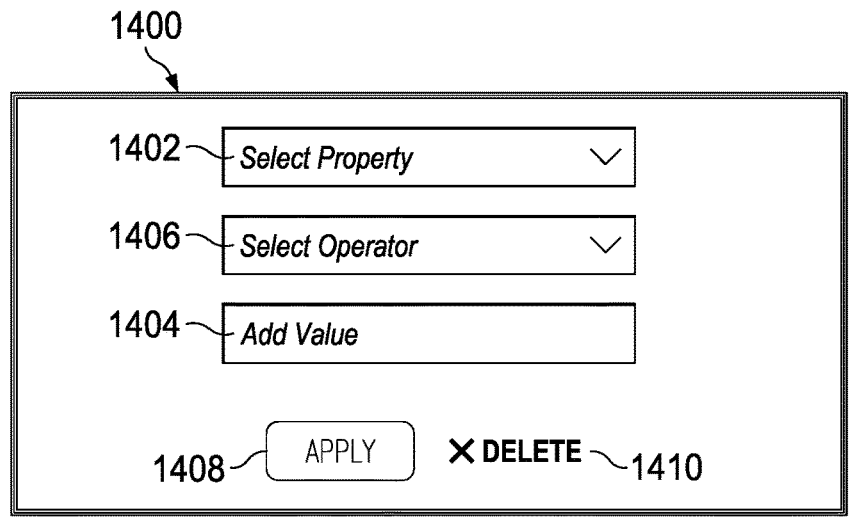
FIG. 14 is an illustration of a define criteria user interface in a group eligibility criteria builder in accordance with an illustrative embodiment.

Turning to FIG. 14, an illustration of a define criteria user interface in a group eligibility criteria builder is depicted in accordance with an illustrative embodiment. Define criteria user interface 1400 is an example of one implementation of define criteria user interface 560 in FIG. 5. Define criteria user interface 1400 prompts a user to select a property 1402, a value 1404 for property 1402, and operator 1406 defining a relationship of value 1404 to property 1402. Define criteria user interface 1400 also includes control elements to apply 1408 any changes made using define criteria user interface 1400 or to delete 1410 any changes made.

Figure 15:
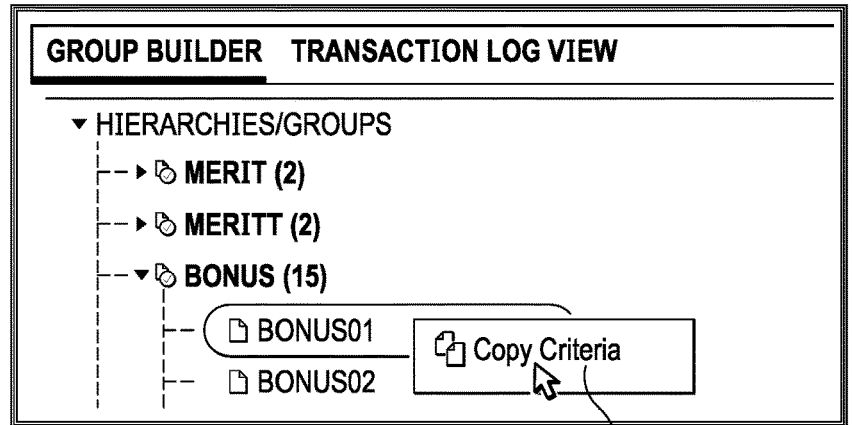
FIG. 15 is an illustration of a copy expression control element in a group eligibility criteria builder in accordance with an illustrative embodiment.

Turning to FIG. 15, an illustration of a copy expression control element in a group eligibility criteria builder is depicted in accordance with an illustrative embodiment. Copy expression control element 1500 is an example of one implementation of copy expression control element 588 in FIG. 5.

Figure 16:
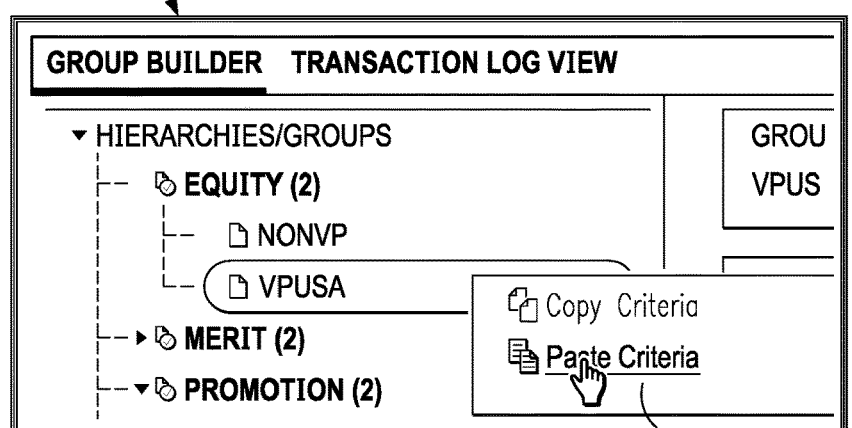
FIG. 16 is an illustration of a paste expression control element in a group eligibility criteria builder in accordance with an illustrative embodiment.

Turning to FIG. 16, an illustration of a paste expression control element in a group eligibility criteria builder is depicted in accordance with an illustrative embodiment. Paste expression control element 1600 is an example of one implementation of paste expression control element 590 in FIG. 5.

Figure 17:
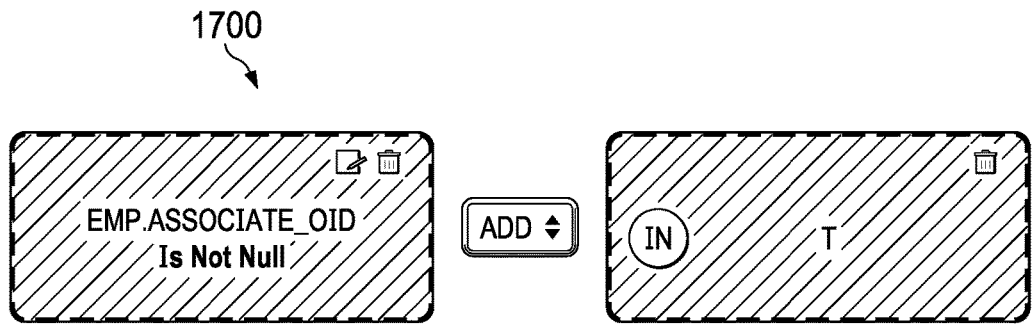
FIG. 17 is an illustration of selecting criteria blocks for grouping into a nested expression in a group eligibility criteria builder in accordance with an illustrative embodiment.

Turning to FIG. 17, an illustration of selecting criteria blocks 1700 for grouping into a nested expression in a group eligibility criteria builder is depicted in accordance with an illustrative embodiment.

Figure 18:
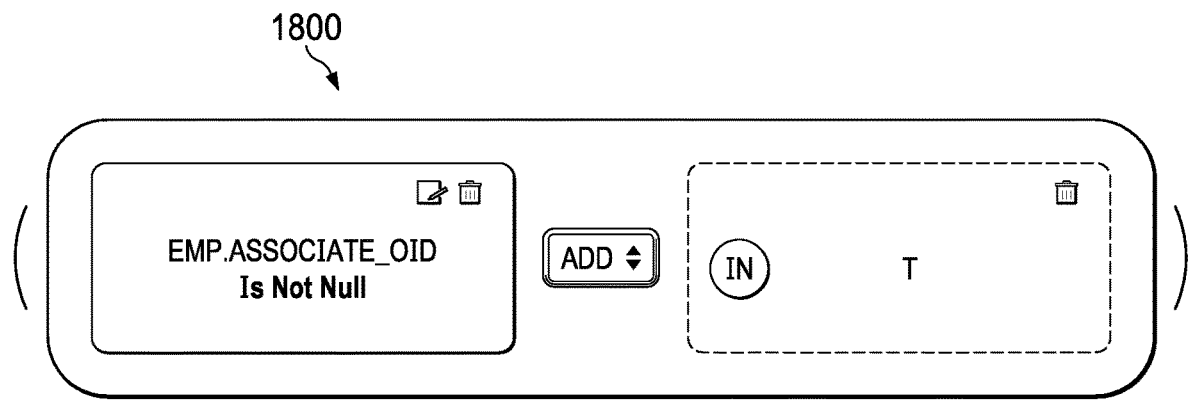
FIG. 18 is an illustration of a grouping of criteria blocks forming a nested expression in a group eligibility criteria builder in accordance with an illustrative embodiment.

Turning to FIG. 18, an illustration of a grouping of criteria blocks forming a nested expression in a group eligibility criteria builder is depicted in accordance with an illustrative embodiment. Nested expression 1800 is an example of one implementation of nested expression 578 in FIG. 5.

Figure 19:
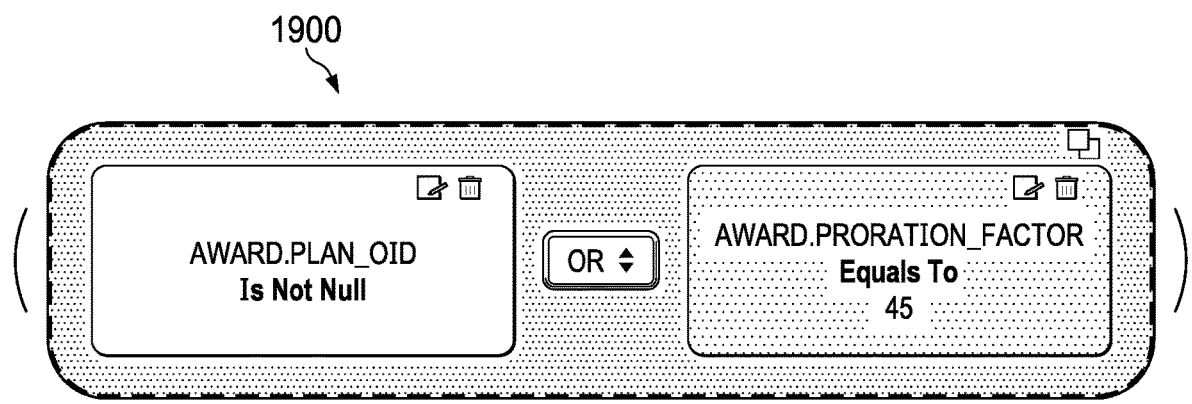
FIG. 19 is an illustration of selecting a grouping of criteria blocks in a nested expression for ungrouping in a group eligibility criteria builder in accordance with an illustrative embodiment.

Turning to FIG. 19, an illustration of selecting a grouping 1900 of criteria blocks in a nested expression for ungrouping in a group eligibility criteria builder is depicted in accordance with an illustrative embodiment.

Figure 20:
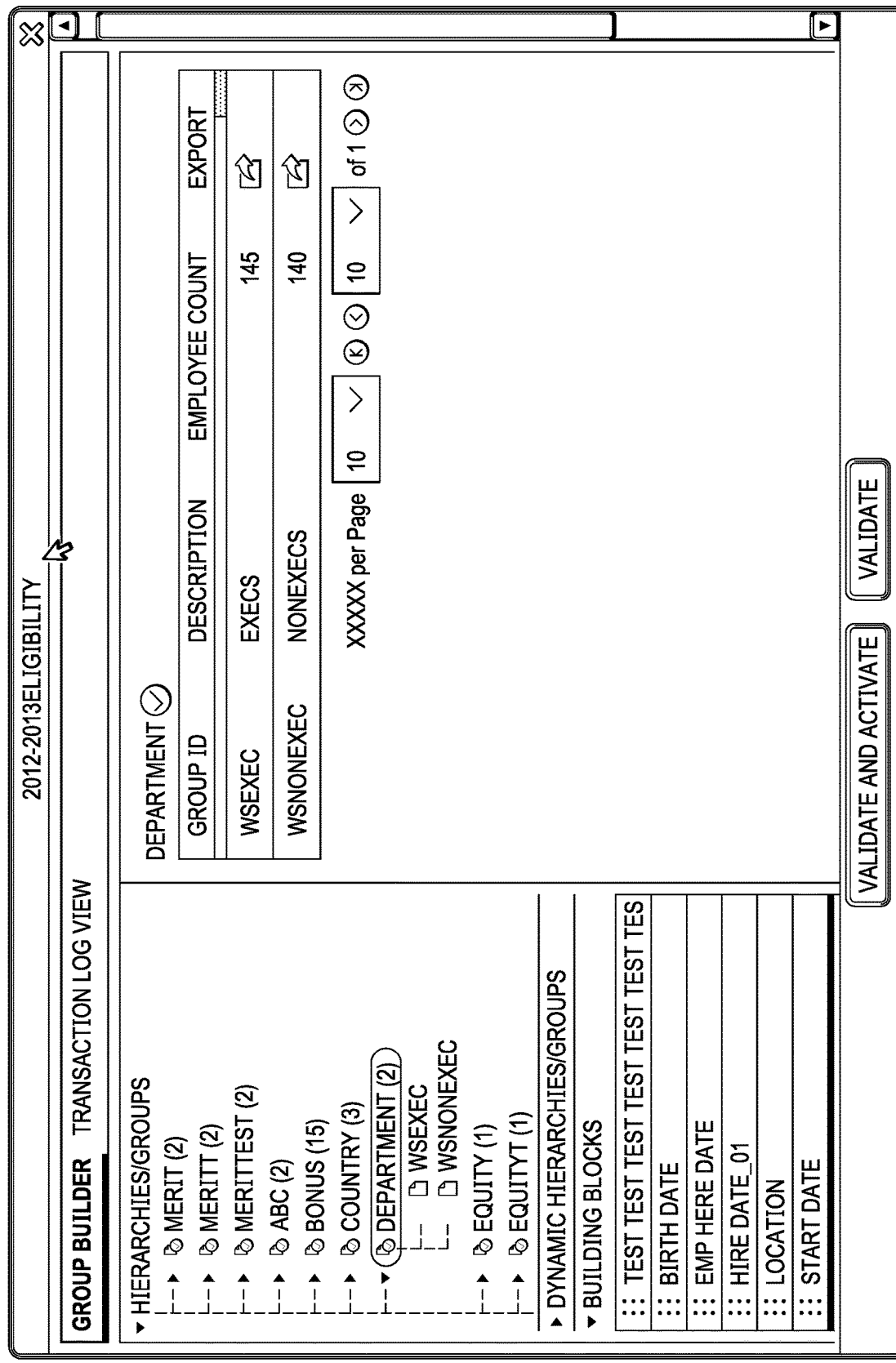
FIG. 20 is an illustration of a hierarchy group display in a group eligibility criteria builder in accordance with an illustrative embodiment.

Turning to FIG. 20, an illustration of a hierarchy group display in a group eligibility criteria builder is depicted in accordance with an illustrative embodiment. Hierarchy group display 2000 is an example of one implementation of hierarchy group display 594 in FIG. 5.

Figure 21:
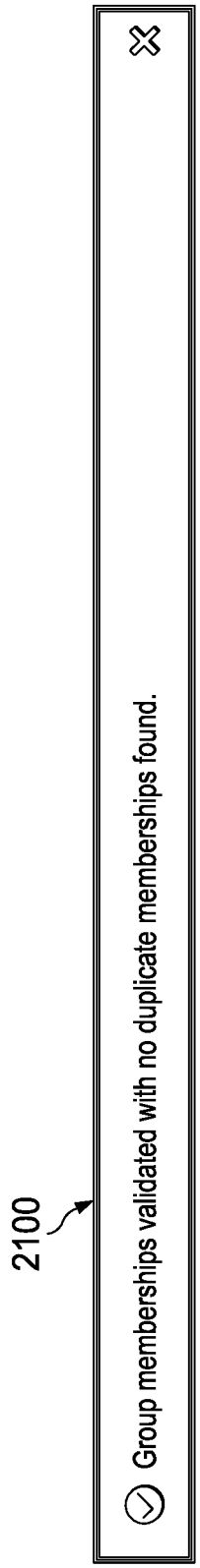
FIG. 21 is an illustration of a successful validation alert in a group eligibility criteria builder in accordance with an illustrative embodiment.

Turning to FIG. 21, an illustration of a successful validation alert in a group eligibility criteria builder is depicted in accordance with an illustrative embodiment. Successful validation alert 2100 is an example of one result in response to selecting a control element to validate 595 a hierarchy in FIG. 5.

Figure 22:
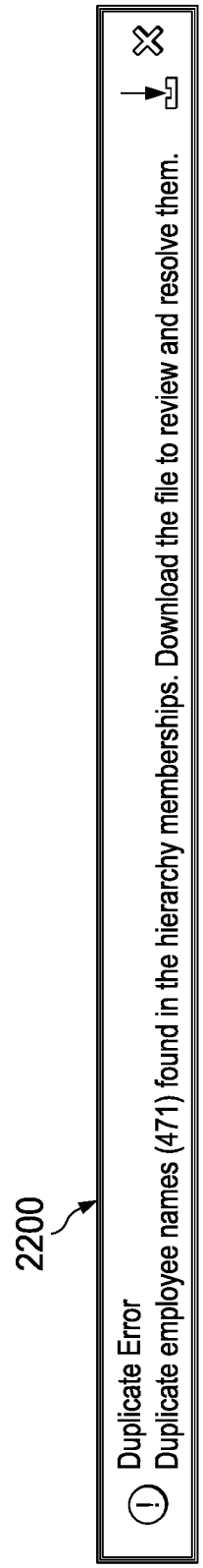
FIG. 22 is an illustration of a validation error alert in a group eligibility criteria builder in accordance with an illustrative embodiment.

Turning to FIG. 22, an illustration of a validation error alert in a group eligibility criteria builder is depicted in accordance with an illustrative embodiment. Validation error alert 2200 is an example of another result in response to selecting the control element to validate 595 a hierarchy in FIG. 5.

Turning to FIG. 23, an illustration of a transaction log in a group eligibility criteria builder is depicted in accordance with an illustrative embodiment. Transaction log 2300 is an example of one implementation of transaction log 598 in FIG. 5.

Figure 24:
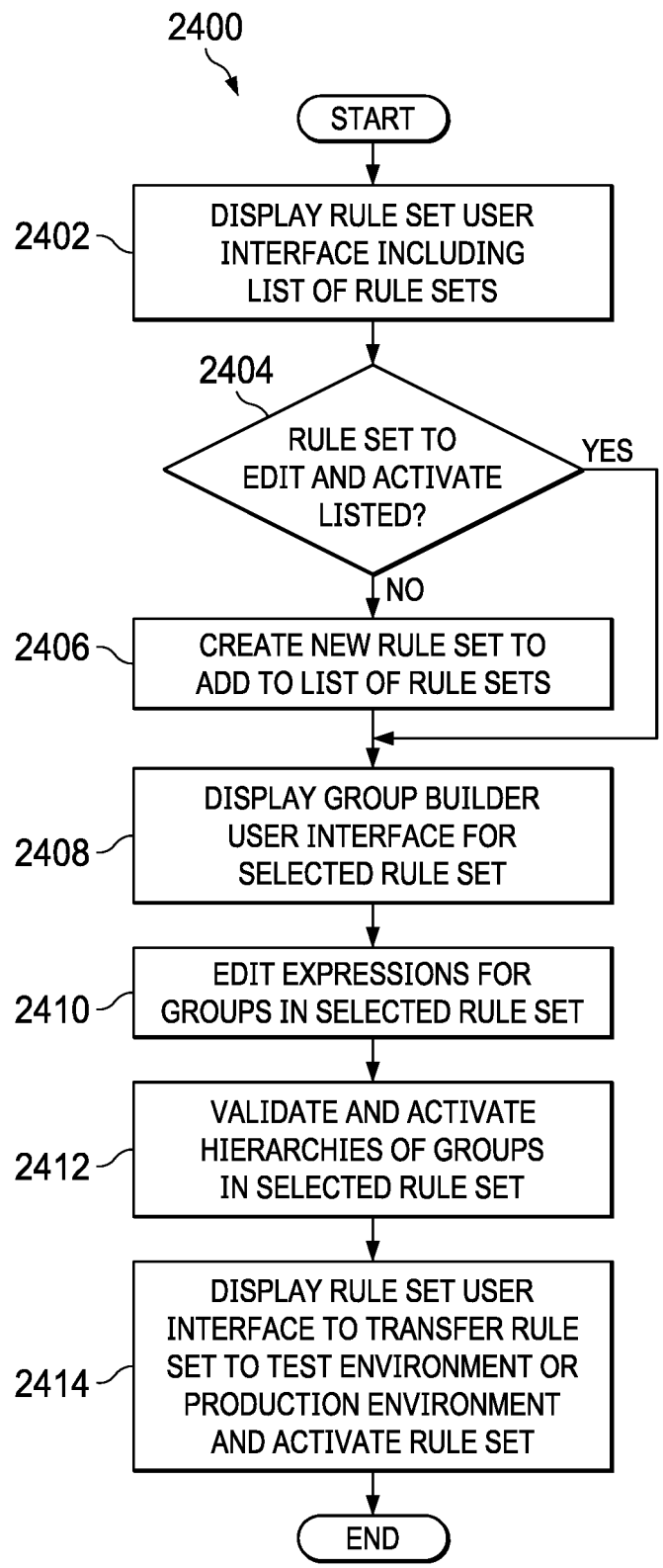
FIG. 24 is an illustration of a flowchart of a process for editing and activating a rule set for group eligibility criteria in accordance with an illustrative embodiment.

Turning to FIG. 24, an illustration of a flowchart of a process for editing and activating a rule set for group eligibility criteria is depicted in accordance with an illustrative embodiment. Process 2400 may be implemented in group eligibility criteria builder 400 in FIG. 4.

Process 2400 begins with displaying a rule set user interface including a list of available rule sets (operation 2402). It is then determined whether a desired rule set to edit or to activate is listed in the list of available rule sets (operation 2404). In response to a determination at operation 2404 that a desired rule set is not listed, a new rule set is created and added to the list of available rule sets (operation 2406).

In response to a determination at operation 2404 that a desired rule set is available, or after adding a new rule set to the list at operation 2406, a group builder user interface is displayed for the selected desired rule set (operation 2408). Expressions for groups in the selected rule set may be edited in the group builder user interface (operation 2410). Hierarchies of groups may then be validated and activated in the group builder user interface (operation 2412). The rule set user interface may then be displayed again to transfer the rule set to a test environment or a production environment (operation 2414), with the process terminating thereafter.

Figure 25:
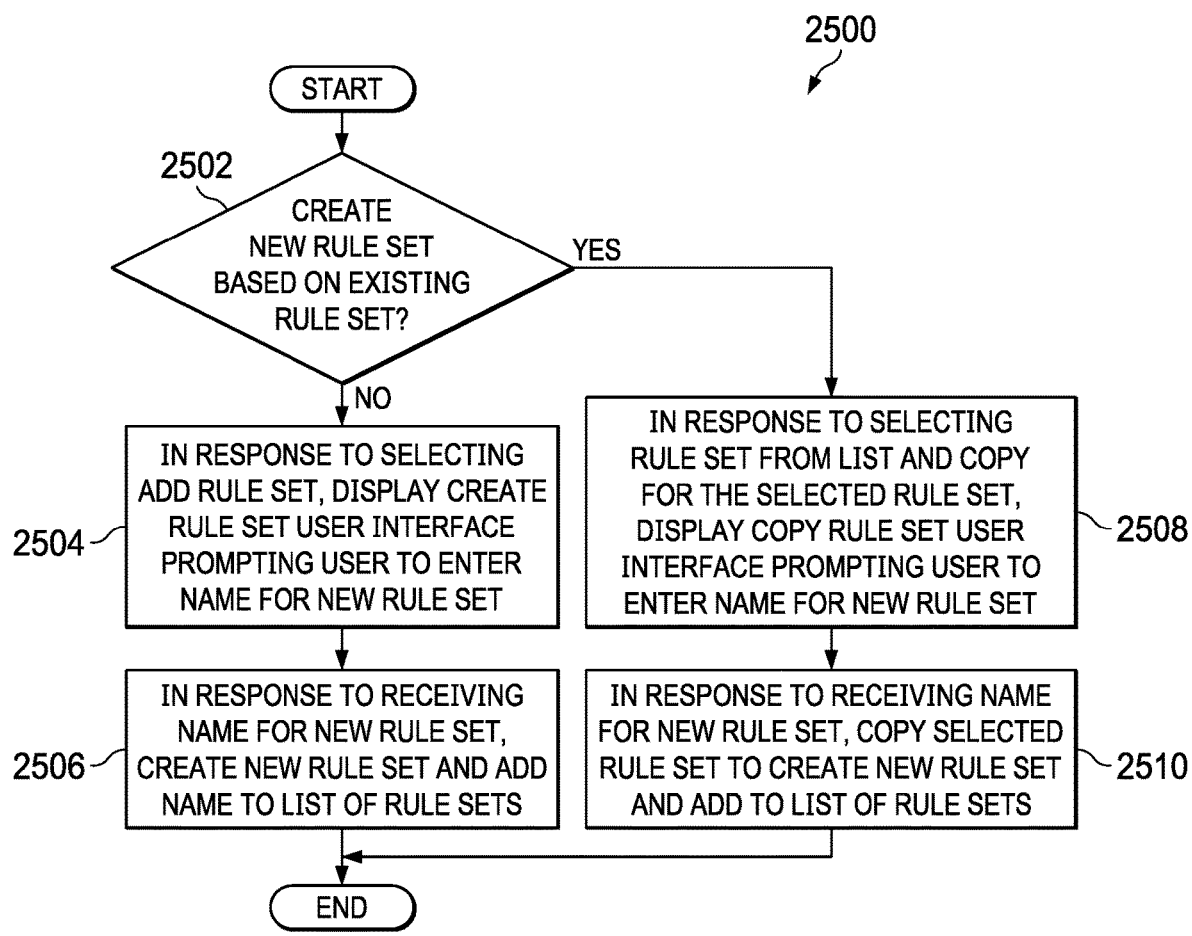
FIG. 25 is an illustration of a flowchart of a process for creating a new rule set for group eligibility criteria in accordance with an illustrative embodiment.

Turning to FIG. 25, an illustration of a flowchart of a process for creating a new rule set for group eligibility criteria is depicted in accordance with an illustrative embodiment. Process 2500 may be implemented in rule set user interface 416 in group eligibility criteria builder 400 in FIG. 4. Process 2500 is an example of one implementation of operation 2406 in process 2400 in FIG. 24.

Process 2500 begins with determining whether to create the new rule set based on an existing rule set (operation 2502). In response to determining that the new rule set will not be based on an existing rule set, a user may select a graphical control element displayed on a graphical user interface to add a rule set. In response to selecting the graphical control element to add a rule set, a create rule set user interface is displayed to prompt the user to enter a name for the new rule set (operation 2504). In response to receiving the name for the new rule set by the create rule set user interface, a new rule set is created and the name for the new rule set is added to the list of rule sets (operation 2506), with the process terminating thereafter. In this case, the new rule set may not have any defined hierarchies or groups.

Returning to operation 2502, in response to determining that the new rule set will be based on an existing rule set, a user may select a rule set from a list of existing rule sets and a graphical control element displayed on a graphical user interface to copy the selected rule set. In response to selecting the existing rule set and the graphical control element to copy the rule set, a copy rule set user interface is displayed to prompt the user to enter a name for the new rule set (operation 2508). In response to receiving the name for the new rule set by the copy rule set user interface, the selected rule set is copied to create the new rule set and the name for the new rule set is added to the list of rule sets (operation 2510), with the process terminating thereafter. In this case, the new rule set may have the same configuration of hierarchies and groups as the selected rule set that was copied to create the new rule set.

Figure 26:
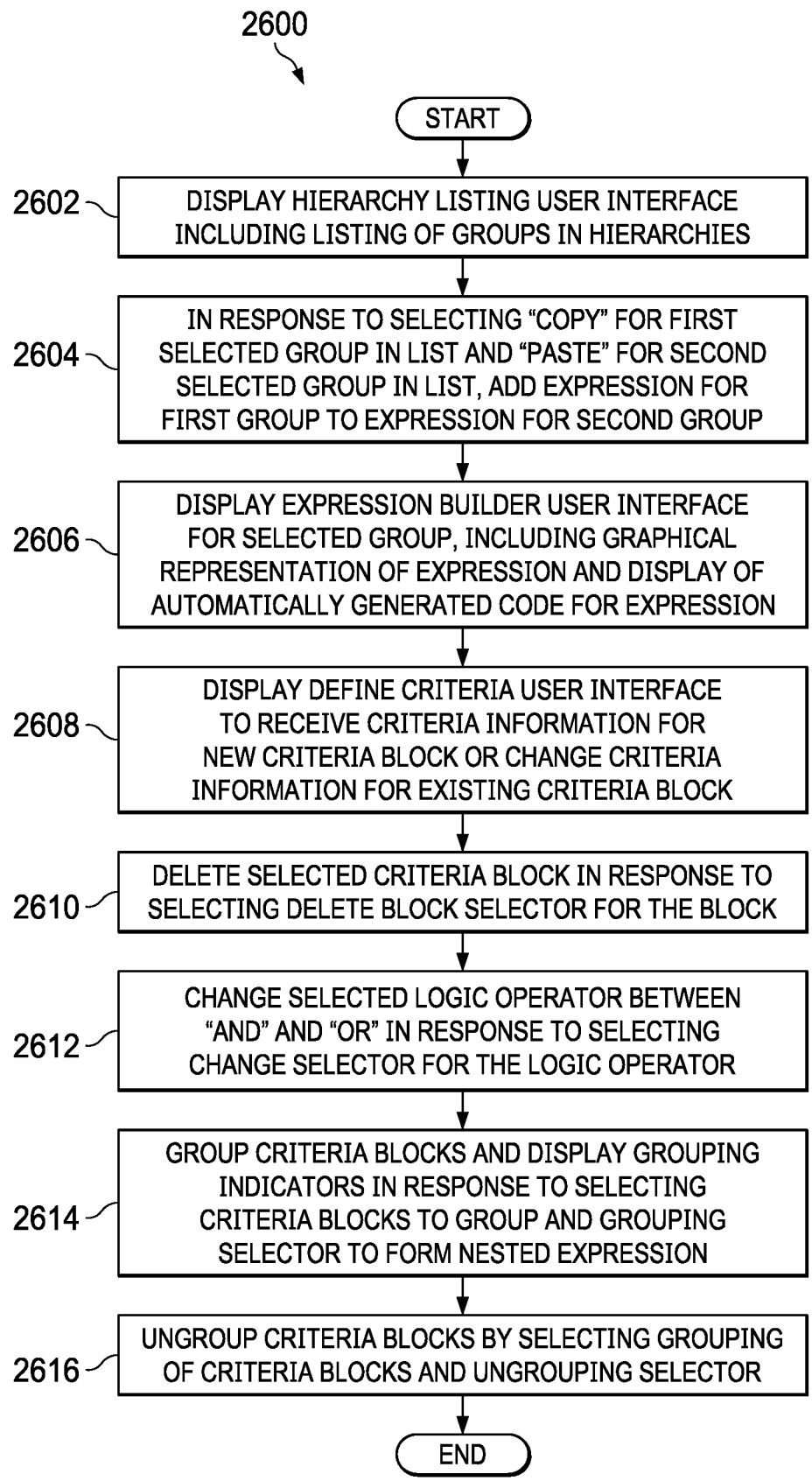
FIG. 26 is an illustration of a flowchart of a process for editing an expression for group eligibility criteria in accordance with an illustrative embodiment.

Turning to FIG. 26, an illustration of a flowchart of a process for editing an expression for group eligibility criteria is depicted in accordance with an illustrative embodiment. Process 2600 may be implemented in group eligibility criteria builder 400 in FIG. 4. Process 2600 is an example of implementations of operation 2410 in process 2400 in FIG. 24.

Process 2600 begins with displaying a hierarchy listing user interface including a listing of groups in hierarchies (operation 2602). In response to selecting "copy" for a first selected group in the list and "paste" for a second selected group in the list, the expression for the first group is added to the expression for the second group (operation 2604).

An expression builder user interface is displayed for a selected group, the expression builder user interface includes a graphical representation of the expression for the group and a display of automatically generated code for the expression (operation 2606). A define criteria user interface is displayed to receive criteria information for a new criteria block for the expression or to change criteria information for an existing criteria block in the expression (operation 2608). A selected criteria block may be deleted in response to selecting a delete block selector for the selected criteria block (operation 2610). A selected logical operator may be changed between AND and OR in response to selecting a change selector for the logical operator (operation 2612).

Criteria blocks may be grouped and grouping indicators displayed in response to selecting criteria blocks to be grouped and a grouping selector to form a nested expression (operation 2614). A grouping of criteria blocks may be ungrouped in response to selecting the grouping of criteria blocks and an ungrouping selector (operation 2616), with the process terminating thereafter.

Figure 27:
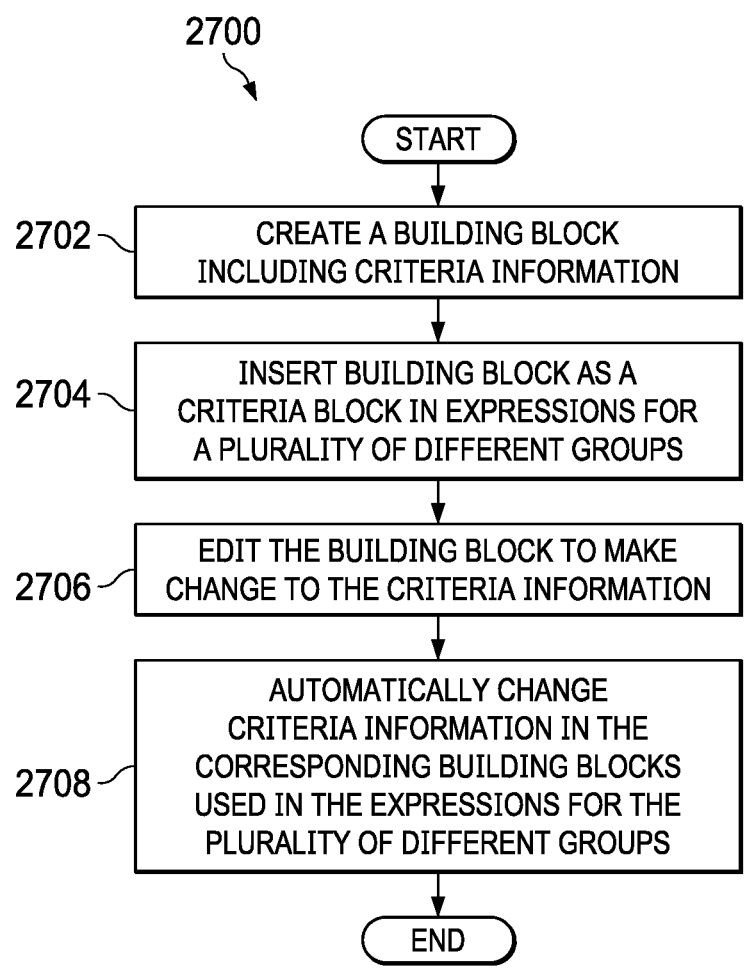
FIG. 27 is an illustration of a flowchart of a process for using building blocks in expressions for group eligibility criteria in accordance with an illustrative embodiment.

Turning to FIG. 27, an illustration of a flowchart of a process for using building blocks in expressions for group eligibility criteria is depicted in accordance with an illustrative embodiment. Process 2700 may be implemented in group eligibility criteria builder 400 in FIG. 4.

Process 2700 begins with creating a building block including criteria information (operation 2702). The building block is inserted as a criteria block in expressions for a plurality of different groups (operation 2704). The building block is then edited to make a change to the criteria of the building block (operation 2706). Criteria information in the corresponding building blocks used in the expressions for the plurality of different groups is then changed automatically (operation 2708), with the process terminating thereafter.

Figure 28:
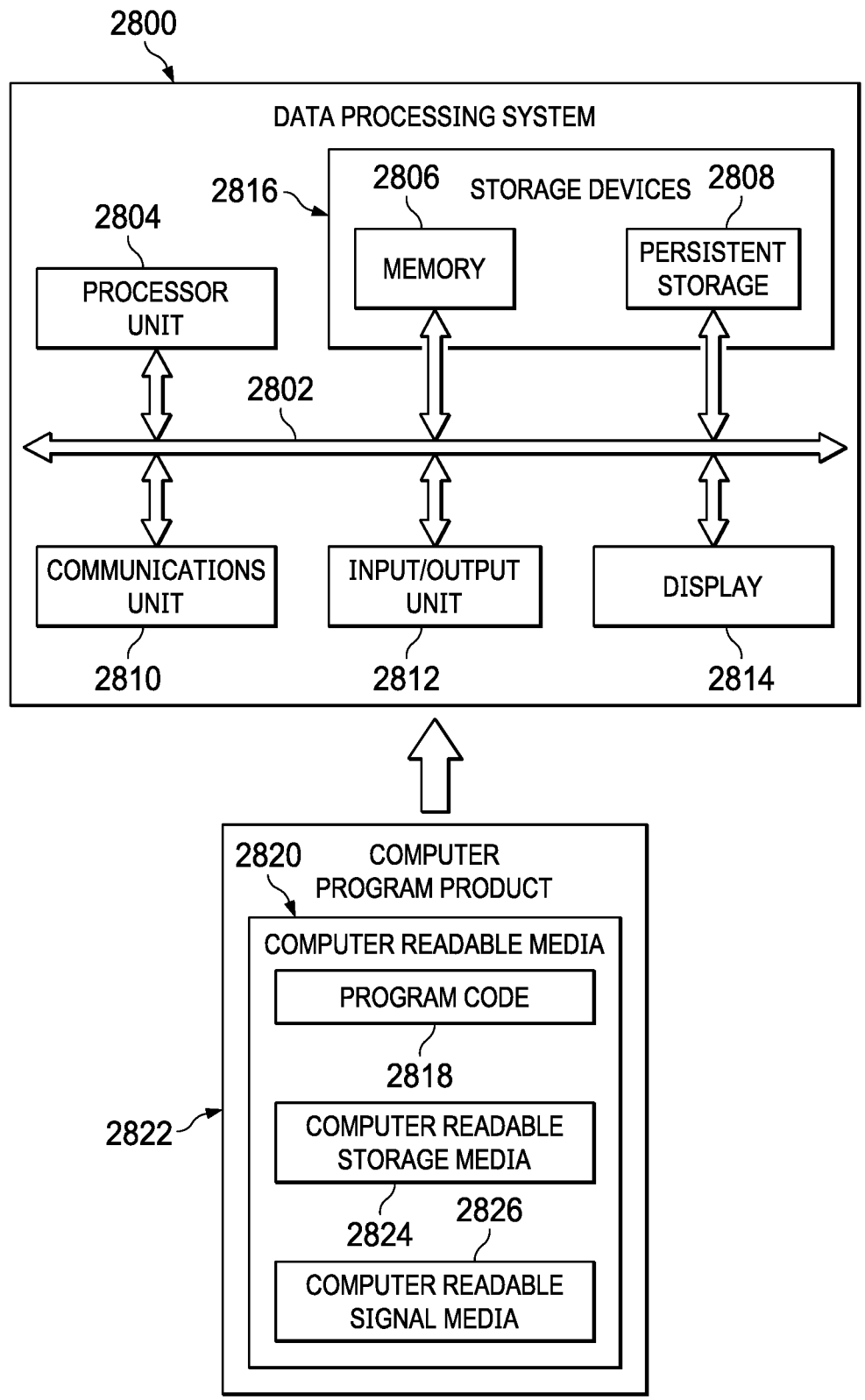
FIG. 28 is an illustration of a block diagram of a data processing system in accordance with an illustrative embodiment.

Turning now to FIG. 28, an illustration of a block diagram of a data processing system is depicted in accordance with an illustrative embodiment. Data processing system 2800 may be used to implement one or more of server computer 104 in FIG. 1, server computer 106 in FIG. 1, client devices 110 in FIG. 1, and computer system 258 in FIG. 2. In this illustrative example, data processing system 2800 includes communications framework 2802, which provides communications between processor unit 2804, memory 2806, persistent storage 2808, communications unit 2810, input/output unit 2812, and display 2814. In this example, communications framework 2802 may take the form of a bus system.

Processor unit 2804 serves to execute instructions for software that may be loaded into memory 2806. Processor unit 2804 may be a number of processors, a multi-processor core, or some other type of processor, depending on the particular implementation. In an embodiment, processor unit 2804 comprises one or more conventional general-purpose central processing units (CPUs). In an alternate embodiment, processor unit 2804 comprises one or more graphical processing units (CPUs).

Memory 2806 and persistent storage 2808 are examples of storage devices 2816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2816 may also be referred to as computer-readable storage devices in these illustrative examples. Memory 2806, in these examples, may be, for example, a random access memory or any other suitable volatile or non-volatile storage device. Persistent storage 2808 may take various forms, depending on the particular implementation.

For example, persistent storage 2808 may contain one or more components or devices. For example, persistent storage 2908 may be a hard drive, a flash memory, a rewritable optical disk, a rewritable magnetic tape, or some combination of the above. The media used by persistent storage 2808 also may be removable. For example, a removable hard drive may be used for persistent storage 2808.

Communications unit 2810, in these illustrative examples, provides for communications with other data processing systems or devices. In these illustrative examples, communications unit 2810 is a network interface card.

Input/output unit 2812 allows for input and output of data with other devices that may be connected to data processing system 2800. For example, input/output unit 2812 may provide a connection for user input through at least one of a keyboard, a mouse, or some other suitable input device. Further, input/output unit 2812 may send output to a printer. Display 2814 provides a mechanism to display information to a user.

Instructions for at least one of the operating system, applications, or programs may be located in storage devices 2816, which are in communication with processor unit 2804 through communications framework 2802. The processes of the different embodiments may be performed by processor unit 2804 using computer-implemented instructions, which may be located in a memory, such as memory 2806.

These instructions are referred to as program code, computer-usable program code, or computer-readable program code that may be read and executed by a processor in processor unit 2804. The program code in the different embodiments may be embodied on different physical or computer-readable storage media, such as memory 2806 or persistent storage 2808.

Program code 2818 is located in a functional form on computer-readable media 2820 that is selectively removable and may be loaded onto or transferred to data processing system 2800 for execution by processor unit 2804. Program code 2818 and computer-readable media 2820 form computer program product 2822 in these illustrative examples. In one example, computer-readable media 2820 may be computer-readable storage media 2824 or computer-readable signal media 2826.

In these illustrative examples, computer-readable storage media 2824 is a physical or tangible storage device used to store program code 2818 rather than a medium that propagates or transmits program code 2818. Alternatively, program code 2818 may be transferred to data processing system 2800 using computer-readable signal media 2826.

Computer-readable signal media 2826 may be, for example, a propagated data signal containing program code 2818. For example, computer-readable signal media 2826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media" can be singular or plural. For example, program code 2818 can be located in computer-readable media 2820 in the form of a single storage device or system. In another example, program code 2818 can be located in computer-readable media 2820 that is distributed in multiple data processing systems. In other words, some instructions in program code 2818 can be located in one data processing system while other instructions in program code 2818 can be located in another data processing system. For example, a portion of program code 2818 can be located in computer-readable media 2820 in a server computer while another portion of program code 2818 can be located in computer-readable media 2820 located in a set of client computers.

The different components illustrated for data processing system 2800 are not meant to provide architectural limitations to the manner in which different embodiments may be implemented. The different illustrative embodiments may be implemented in a data processing system including components in addition to or in place of those illustrated for data processing system 2800. Other components shown in FIG. 28 can be varied from the illustrative examples shown. The different embodiments may be implemented using any hardware device or system capable of running program code 2818.

The various control elements described herein may be implemented in any appropriate manner to provide an appropriate element of interaction in a user interface for a user to make a selection or take other appropriate action. Control elements as described herein also may be referred to as graphical widgets, graphical control elements, controls, or using other appropriate terminology. For example, without limitation, a control element described herein may be implemented as a virtual button or in any other appropriate manner.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for generating expressions, comprising:
one or more processors, coupled with memory, to:
  display a graphical representation of a first expression, the first expression comprising a plurality of criteria blocks and logical operator blocks, the first expression to establish a first group of one or more employees, wherein a first criteria block of the plurality of criteria blocks comprises:
    (i) criteria information defining a criteria for inclusion in the first group,
    (ii) an edit block control element, and
    (iii) a delete block control element;
  in response to selecting, by a user, an expression control element associated with the first criteria block of the plurality of criteria blocks, add the first criteria block of the plurality of criteria blocks to a second expression to establish a second group, the second expression to include the criteria information defining the criteria;
  in response to selecting, by the user, the edit block control element for the first criteria block of the plurality of criteria blocks, display a define criteria user interface, wherein the define criteria user interface is configured to receive from the user a change to the criteria information for the first criteria block of the plurality of criteria blocks, wherein the change to the criteria information for the first criteria block of the plurality of criteria blocks changes eligibility for inclusion in the first group, wherein the change to the criteria information also changes eligibility for inclusion in the second group based on the second expression including the criteria information for the first criteria block, a modification to the first expression changes the eligibility for inclusion in the first group, and a modification to the second expression changes the eligibility for inclusion in the second group; and in response to selecting by the user the delete block control element for the first criteria block, delete the first criteria block from the first expression.

2. The apparatus of claim 1, wherein the criteria information comprises information identifying a property, a value for the property, and an operator that defines a relationship of the value to the property.

3. The apparatus of claim 1, wherein:
each of the logical operator blocks is an AND logical operator or an OR logical operator and includes a change control element; and the one or more processors are further configured to:
in response to selecting by the user the change control element for a selected logical operator block in the logical operator blocks that is the AND logical operator, change the selected logical operator block to the OR logical operator; and
in response to selecting by the user the change control element for the selected logical operator block in the logical operator blocks that is the OR logical operator, change the selected logical operator block to the AND logical operator.

4. The apparatus of claim 1, wherein the one or more processors are configured to:
in response to selecting by the user one or more criteria blocks of the plurality of criteria blocks in the graphical representation of the first expression, display a grouping control element; and
in response to selecting by the user the grouping control element, group the one or more criteria blocks to form a nested expression within the first expression and display grouping indicators to indicate the one or more criteria blocks in the nested expression in the graphical representation of the first expression.

5. The apparatus of claim 4, wherein the grouping indicators comprise parentheses.

6. The apparatus of claim 4, wherein the one or more processors are further configured to:
in response to selecting by the user the one or more criteria blocks in the nested expression in the graphical representation of the first expression, display an ungrouping control element; and
in response to selecting by the user the ungrouping control element, ungroup the one or more criteria blocks and stop displaying the grouping indicators.

7. The apparatus of claim 1, wherein the one or more processors are further configured to:
display an add criteria block control element;
in response to selecting by the user the add criteria block control element, display a define criteria user interface configured to prompt the user to enter criteria information for a new criteria block; and
in response to receiving the criteria information for the new criteria block from the user by the define criteria user interface, add the new criteria block to the graphical representation of the first expression.

8. The apparatus of claim 1, further comprising:
a code generator configured to generate automatically code for implementing the first expression in a test environment or in a production environment; and a code display configured to display the code at the same time as the graphical representation of the first expression.

9. The apparatus of claim 1, wherein the first expression defines characteristics of employees for determining whether an employee is included in the first group.

10. The apparatus of claim 9, wherein the first group is a compensation plan or a performance plan.

11. The apparatus of claim 9, further comprising an employee count display including a display of a number of the employees included in the first group defined by the first expression displayed at the same time.

12. The apparatus of claim 9, further comprising an employee test user interface configured to:
prompt the user to enter an employee identifier to identify a selected employee; and
in response to receiving the employee identifier from the user, determine whether the selected employee is included in the first group defined by the first expression.

13. The apparatus of claim 9, further comprising a hierarchy listing user interface comprising a listing of a plurality of groups, wherein the hierarchy listing user interface is configured to:
in response to selecting, by the user, a first selected group from the listing of the plurality of groups, display a copy expression control element;
in response to selecting, by the user, the copy expression control element and a second selected group from the listing of the plurality of groups, display a paste expression control element; and
in response to selecting, by the user, the paste expression control element, add a given expression for the first selected group to a second given expression for the second selected group.

14. A method for generating expressions, the method comprising:
displaying, by a computer system, a graphical representation of a first expression, the first expression comprising a plurality of criteria blocks and logical operator blocks, the first expression to establish a first group of one or more employees, wherein the first criteria block of the plurality of criteria blocks comprises:
(i) criteria information defining a criteria for inclusion in the first group,
(ii) an edit block control element, and
(iii) a delete block control element;
in response to selecting, by a user, an expression control element associated with first criteria block of the plurality of criteria blocks, adding, by the computer system, the first criteria block of the plurality of criteria blocks to a second expression to establish a second group, the second expression to include the criteria information defining the criteria;
in response to selecting, by the user, the edit block control element for the first criteria block of the plurality of criteria blocks, displaying, by the computer system, a define criteria user interface, wherein the define criteria user interface is configured to receive from the user a change to the criteria information for the first criteria block of the plurality of criteria blocks, wherein the change to the criteria information for the first criteria block of the plurality of criteria blocks changes eligibility for inclusion in the first group, wherein the change to the criteria information also changes eligibility for inclusion in the second group based on the second expression including the criteria information for the first criteria block, a modification to the first expression changes the eligibility for inclusion in the first group, and a modification to the second expression changes the eligibility for inclusion in the second group; and in response to selecting by the user the delete block control element for the first criteria block, deleting, by the computer system, the first criteria block from the first expression.

15. The method of claim 14, wherein the criteria information comprises information identifying a property, a value for the property, and an operator that defines a relationship of the value to the property.

16. The method of claim 14, wherein:
each of the logical operator blocks is an AND logical operator or an OR logical operator and includes a change control element;
in response to selecting by the user the change control element for a selected logical operator block in the logical operator blocks that is the AND logical operator, changing the selected logical operator block to the OR logical operator by the computer system; and
in response to selecting by the user the change control element for a selected logical operator block in the logical operator blocks that is the OR logical operator, changing the selected logical operator block to the AND logical operator by the computer system.

17. The method of claim 14, further comprising:
in response to selecting by the user one or more criteria blocks of the plurality of criteria blocks in the graphical representation of the first expression, displaying a grouping control element by the computer system;
in response to selecting by the user the grouping control element, grouping, by the computer system, the one or more criteria blocks to form a nested expression within the first expression; and
displaying, by the computer system, grouping indicators to indicate the one or more criteria blocks in the nested expression in the graphical representation of the first expression.

18. The method of claim 17, wherein the grouping indicators comprise parentheses.

19. The method of claim 17, further comprising:
in response to selecting by the user the one or more criteria blocks in the nested expression in the graphical representation of the first expression, displaying an ungrouping control element by the computer system; and
in response to selecting by the user the ungrouping control element, ungrouping the one or more criteria blocks by the computer system and stopping displaying the grouping indicators by the computer system.

20. The method of claim 14, further comprising:
displaying, by the computer system, an add criteria block control element;
in response to selecting by the user the add criteria block control element, displaying, by the computer system, a define criteria user interface, wherein the define criteria user interface is configured to prompt the user to enter criteria information for a new criteria block; and
in response to receiving the criteria information for the new criteria block from the user by the define criteria user interface, adding the new criteria block to the graphical representation of the first expression by the computer system.

21. The method of claim 14, further comprising:
generating automatically, by the computer system, code for implementing the first expression in a test environment or in a production environment; and
displaying, by the computer system, the code at the same time as the graphical representation of the first expression.

22. The method of claim 14, wherein the first expression defines characteristics of employees for determining whether an employee is included in the first group.

23. The method of claim 22, wherein the first group is a compensation plan or a performance plan.

24. The method of claim 22, further comprising displaying, by the computer system, an employee count indicating a number of employees included in the first group defined by the expression displayed at the same time in the graphical representation of the first expression.

25. The method of claim 22, further comprising:
prompting the user, by the computer system, to enter an employee identifier that identifies a selected employee; and
in response to receiving the employee identifier from the user, determining, by the computer system, whether the selected employee is included in the first group defined by the expression displayed in the graphical representation of the first expression.

26. The method of claim 22, further comprising:
displaying, by the computer system, a listing of a plurality of groups;
in response to selecting, by the user, a first selected group from the listing of the plurality of groups, displaying, by the computer system, a copy expression control element;
in response to selecting, by the user, the copy expression control element and a second selected group from the listing of the plurality of groups, displaying, by the computer system, a paste expression control element; and
in response to selecting, by the user, the paste expression control element, adding a given expression for the first selected group to a second given expression for the second selected group by the computer system.

27. A computer program product for generating expressions, the computer program product comprising a non-transitory computer readable storage medium having program instructions embodied therewith, the program instructions executable by a device to cause the device to:
display a graphical representation of a first expression, the first expression comprising a plurality of criteria blocks and logical operator blocks, the first expression to establish a first group of one or more employees, wherein a first criteria block of the plurality of criteria blocks comprises:
(i) criteria information defining a criteria for inclusion in the first group,
(ii) an edit block control element, and
(iii) a delete block control element;
in response to selecting, by a user, an expression control element associated with the first criteria block of the plurality of criteria blocks, add the first criteria block of the plurality of criteria blocks to a second expression to establish a second group, the second expression to include the criteria information defining the criteria;
in response to selecting by the user the edit block control element for the first criteria block of the plurality of criteria blocks, display a define criteria user interface, wherein the define criteria user interface is configured to receive from the user a change to the criteria information for the first criteria block of the plurality of criteria blocks, wherein the change to the criteria information for the first criteria block of the plurality of criteria blocks changes eligibility for inclusion in the first group, wherein the change to the criteria information also changes eligibility for inclusion in the second group based on the second expression including the criteria information for the first criteria block, a modification to the first expression changes the eligibility for inclusion in the first group, and a modification to the second expression changes the eligibility for inclusion in the second group; and in response to selecting by the user the delete block control element for the first criteria block, delete the first criteria block from the first expression.

28. The computer program product of claim 27, wherein the criteria information comprises information identifying a property, a value for the property, and an operator that defines a relationship of the value to the property.

29. The computer program product of claim 27, wherein:
each of the logical operator blocks is an AND logical operator or an OR logical operator and includes a change control element; and
the program instructions are executable by the device to cause the device to:
in response to selecting by the user the change control element for a selected logical operator block in the logical operator blocks that is the AND logical operator, change the selected logical operator block to the OR logical operator; and
in response to selecting by the user the change control element for the selected logical operator block in the logical operator blocks that is the OR logical operator, change the selected logical operator block to the AND logical operator.

30. The computer program product of claim 27, wherein the program instructions are executable by the device to cause the device to:
in response to selecting by the user one or more criteria blocks of the plurality of criteria blocks in the graphical representation of the first expression, display a grouping control element; and
in response to selecting by the user the grouping control element, group the one or more criteria blocks to form a nested expression within the first expression and display grouping indicators to indicate the one or more criteria blocks in the nested expression in the graphical representation of the first expression.

31. The computer program product of claim 30, wherein the grouping indicators comprise parentheses.

32. The computer program product of claim 30, wherein the program instructions are executable by the device to cause the device to:
in response to selecting by the user the one or more criteria blocks in the nested expression in the graphical representation of the first expression, display an ungrouping control element; and in response to selecting by the user the ungrouping control element, ungroup the one or more criteria blocks and stop displaying the grouping indicators.

33. The computer program product of claim 27, wherein the program instructions are executable by the device to cause the device to:
display an add criteria block control element;
in response to selecting by the user the add criteria block control element, prompt the user to enter criteria information for a new criteria block; and
in response to receiving the criteria information for the new criteria block from the user, add the new criteria block to the graphical representation of the first expression.

34. The computer program product of claim 27, wherein the program instructions are executable by the device to cause the device to:
generate automatically code for implementing the first expression in a test environment or in a production environment; and
display the code at the same time as the graphical representation of the first expression.

35. The computer program product of claim 27, wherein the first expression defines characteristics of employees for determining whether an employee is included in the first group.

36. The computer program product of claim 35, wherein the first group is a compensation plan or a performance plan.

37. The computer program product of claim 35, wherein the program instructions are executable by the device to cause the device to display an employee count of a number of the employees included in the first group defined by the first expression displayed at the same time in the graphical representation of the first expression.

38. The computer program product of claim 35, wherein the program instructions are executable by the device to cause the device to:
prompt the user to enter an employee identifier that identifies a selected employee; and
in response to receiving the employee identifier from the user, determine whether the selected employee is included in the first group defined by the expression displayed in the graphical representation of the first expression.

39. The computer program product of claim 35, wherein the program instructions are executable by the device to cause the device to:
display a listing of a plurality of groups;
in response to selecting, by the user, a first selected group from the listing of the plurality of groups, display a copy expression control element;
in response to selecting, by the user, the copy expression control element and a second selected group from the listing of the plurality of groups, display a paste expression control element; and
in response to selecting, by the user, the paste expression control element, add a given expression for the first selected group to a second given expression for the second selected group.

* * * * *